(12) United States Patent
Ieradi

(10) Patent No.: US 11,603,663 B2
(45) Date of Patent: Mar. 14, 2023

(54) STRUT AND METHOD OF USING SAME

(71) Applicant: Giuseppe Ieradi, Maple (CA)

(72) Inventor: Giuseppe Ieradi, Maple (CA)

(73) Assignee: Giuseppe Ieradi, Maple (CA)

( * ) Notice: Subject to any disclaimer, the term of this patent is extended or adjusted under 35 U.S.C. 154(b) by 0 days.

(21) Appl. No.: 16/830,041

(22) Filed: Mar. 25, 2020

(65) Prior Publication Data
US 2020/0308834 A1 Oct. 1, 2020

Related U.S. Application Data

(60) Provisional application No. 62/824,110, filed on Mar. 26, 2019.

(51) Int. Cl.
| | | |
|---|---|---|
| *E04C 3/32* | (2006.01) |
| *E04C 3/08* | (2006.01) |
| *E04C 3/11* | (2006.01) |
| *H02S 20/23* | (2014.01) |
| *H02S 30/10* | (2014.01) |
| *A01G 9/14* | (2006.01) |
| *E04C 3/04* | (2006.01) |
| *A01G 9/24* | (2006.01) |

(52) U.S. Cl.
CPC .............. *E04C 3/32* (2013.01); *E04C 3/08* (2013.01); *E04C 3/11* (2013.01); *H02S 20/23* (2014.12); *H02S 30/10* (2014.12); *A01G 9/14* (2013.01); *A01G 9/243* (2013.01); *E04C 2003/0443* (2013.01); *E04C 2003/0491* (2013.01)

(58) Field of Classification Search
CPC ..... E04C 3/32; E04C 3/08; E04C 3/11; E04C 2003/0491; E04C 3/292; E04C 2003/0486; E04C 2003/0443; A01G 9/14; A01G 9/243; H02S 20/23; H02S 30/10
USPC .................................................... 52/692–696
See application file for complete search history.

(56) References Cited

U.S. PATENT DOCUMENTS

| | | | | |
|---|---|---|---|---|
| 2,154,944 A | * | 4/1939 | Kullmer | E04C 3/292 52/376 |
| 2,167,835 A | * | 8/1939 | Greulich | E04C 3/292 52/376 |
| 3,044,585 A | * | 7/1962 | Handley | E04C 3/32 52/650.2 |
| 3,708,942 A | * | 1/1973 | Leonard | F16B 15/0046 52/694 |

(Continued)

FOREIGN PATENT DOCUMENTS

| | | | | |
|---|---|---|---|---|
| FR | 1100070 A | * | 9/1955 | ............ E04C 3/292 |
| GB | 1232592 A | * | 5/1971 | |
| WO | WO89/11011 A1 | * | 11/1989 | |

*Primary Examiner* — Theodore V Adamos
(74) *Attorney, Agent, or Firm* — Norton Rose Fulbright Canada LLP

(57) ABSTRACT

A strut and method using same is provided. The strut comprises a body member having a longitudinal axis, a first end and a second end. A first gripping member is connected to the first end of the body member. The first gripping member comprises a first plate for engaging a first structural engagement member. A second gripping member is connected to the second end of the body member. The second gripping member comprises a second plate for engaging a second structural member. The body member of the strut extends in a direction to intercept each of the first and second plates.

17 Claims, 22 Drawing Sheets

(56) References Cited

U.S. PATENT DOCUMENTS

| | | | | |
|---|---|---|---|---|
| 3,857,218 | A * | 12/1974 | Gilb | E04C 3/292 52/694 |
| 4,004,334 | A * | 1/1977 | Greenley | B21D 47/02 29/897 |
| 4,291,515 | A * | 9/1981 | Harding | E04C 3/09 52/650.1 |
| 4,682,460 | A * | 7/1987 | Reetz | E04C 3/292 52/632 |
| 5,852,908 | A * | 12/1998 | Nankin | E04C 3/292 52/838 |
| 2002/0148189 | A1* | 10/2002 | Steadman | E04C 3/292 52/690 |
| 2012/0180422 | A1* | 7/2012 | Noturno | E04G 21/1891 52/696 |
| 2013/0239512 | A1* | 9/2013 | Yang | E04B 5/14 52/741.3 |
| 2014/0311082 | A1* | 10/2014 | Sidhu | E04H 9/00 52/693 |
| 2017/0073969 | A1* | 3/2017 | Kriston | E04C 3/09 |

* cited by examiner

1200

```
START
  │
  ▼
```

PROVIDING A BASE HAVING OPPOSING LEGS WHICH DEFINE A CHORD RECEIVING AREA FOR RECEIVING A CHORD; ONE OR MORE LATERAL SUPPORT ARMS CONNECTED TO THE BASE, THE LATERAL SUPPORT ARMS EACH HAVING A SUPPORTING SURFACE CONFIGURED TO SUPPORT ONE OR MORE SOLAR PANELS; A CENTRAL SUPPORT MEMBER DEFINING A FASTENER RECEIVING CHANNEL; A RETAINER MEMBER DEFINING AN OPENING TO PERMIT TRANSIT OF A FASTENER THROUGH THE OPENING TO THE FASENER RECEIVING CHANNEL, THE RETAINING MEMBER HAVING ONE OR MORE RETAINING PORTIONS EACH CONFIGURED TO RECEIVE A GASKET TO SEAL A JUNCTION BETWEEN THE RETAINER MEMBER AND ONE OF THE ONE OR MORE SOLAR PANELS; ONE OR MORE GASKETS EACH CONFIGURED TO SEALINGLY CONNECT WITH ONE OF THE ONE OR MORE RETAINING PORTIONS AND ONE OF THE ONE OR MORE SOLAR PANELS; AND A FASTENER TO CONNECT THE RETAINING MEMBER WITH THE CENTRAL SUPPORT MEMBER.

1202

CONNECTING A CHORD WITH THE CHORD RECEIVING AREA OF THE BASE

1204

DISPOSING A FIRST GASKET BETWEEN THE SOLAR PANEL AND A LATERAL SUPPORT ARM

1206

OVERLAYING A SOLAR PANEL THE LATERAL SUPPORT ARM

1206

CONNECTING A SECOND GASKET TO ONE OF THE RETAINING PORTIONS AND DISPOSING THE SECOND GASKET BETWEEN THE ONE RETAINING PORTION AND THE SOLAR PANEL

1208

FASTENING THE RETAINING MEMBER TO THE CENTRAL SUPPORT MEMBER

1210

CONNECTING A CAP TO THE RETAINING MEMBER

1212

END

FIG. 12

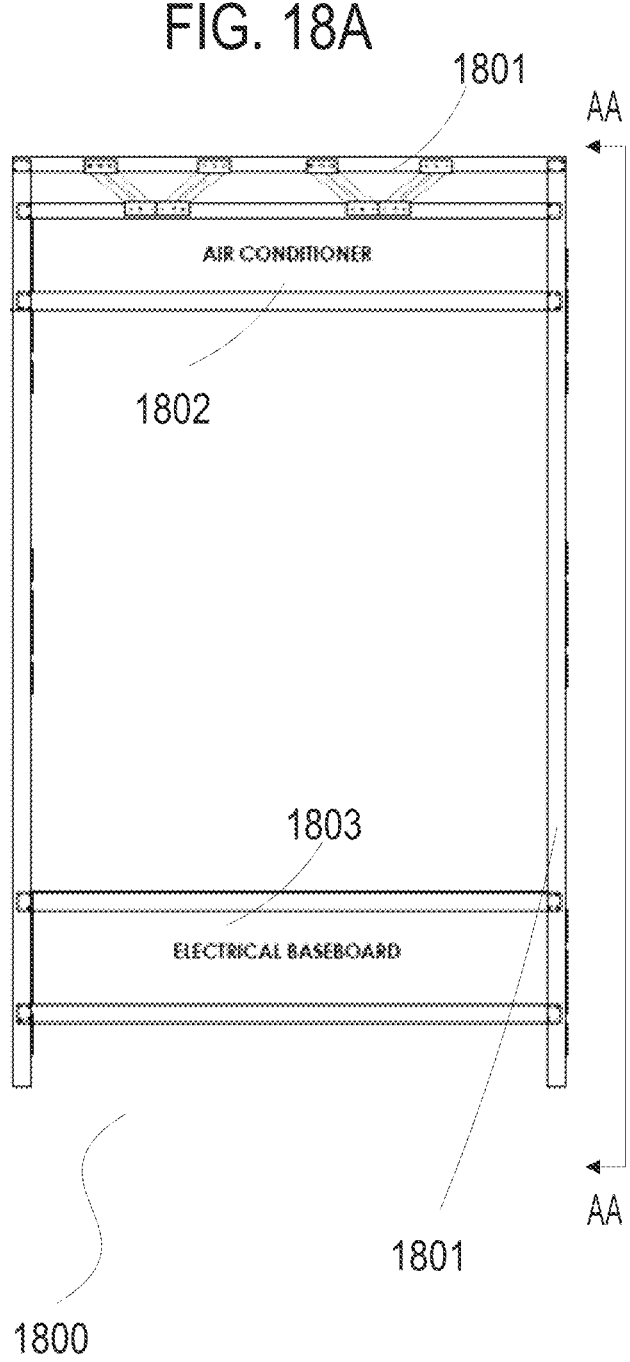
FIG. 18A
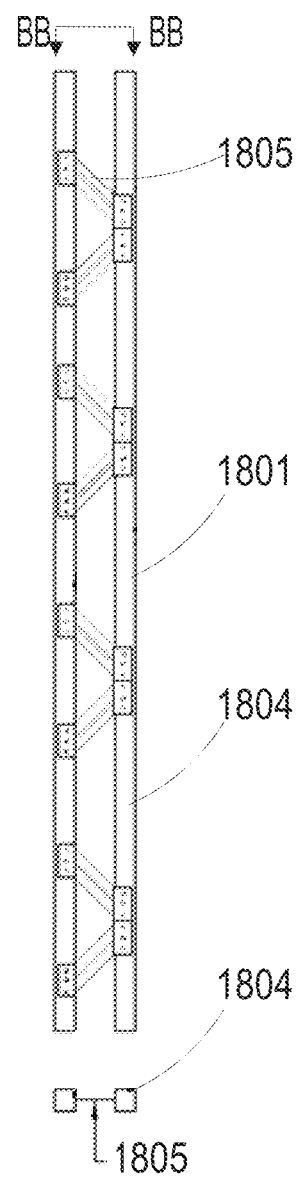
FIG. 18B
FIG. 18C

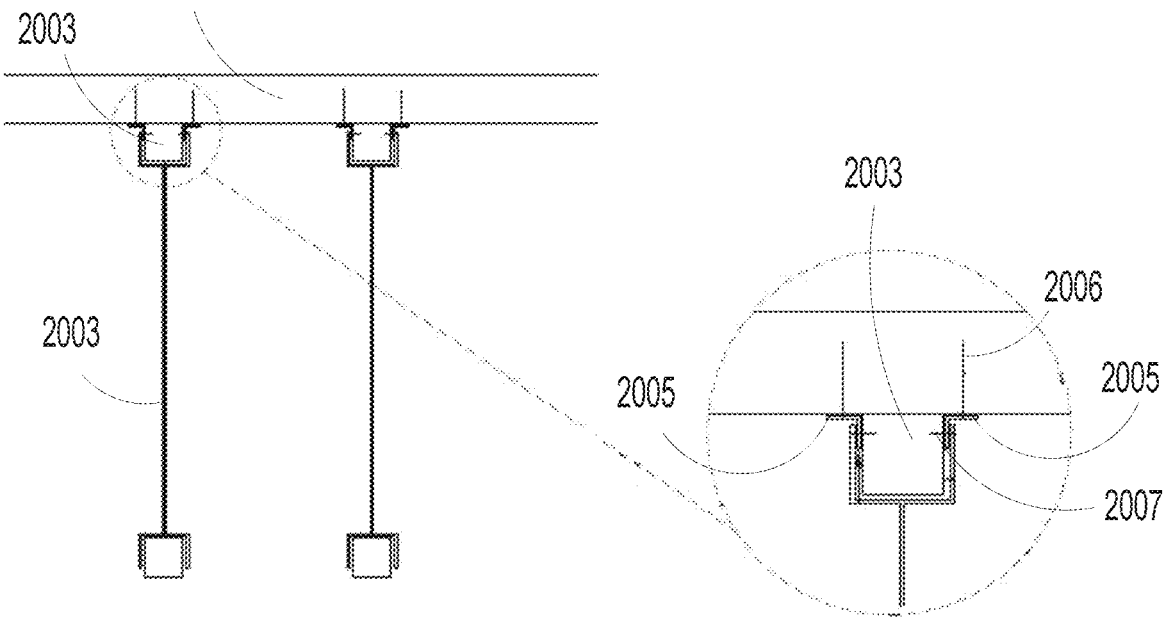

STRUT AND METHOD OF USING SAME

CROSS REFERENCE TO RELATED APPLICATION

This application is a non-provisional application of U.S. Provisional Patent Application No. 62/824,110, filed Mar. 26, 2019, which is hereby incorporated by reference herein in its entirety.

FIELD

The present invention relates to building structures, and in particular, to a strut to form a truss.

BACKGROUND

Trusses are typically formed from triangular units made of straight members that are connected at joints. Planar trusses are those in which all members lies in a two-dimensional plane and space trusses extend into three dimensions. In each case, the structure of a truss may be made of cords (the top and bottom beams) and interior beams called webs which includes struts. A typical strut may be a beam cut to a desired dimension at a worksite and then connected to chords to form a truss or web of trusses. To minimize labour and installation time, pre-fabricated web systems have been developed which generally include multiple adjustable components; however, these web systems require labour to assemble each component into a strut and may reduce the ability of the strut to resist compression and shearing forces applied to the truss.

SUMMARY

According to an aspect of the invention, an improved strut is provided.

In an embodiment, the strut comprises a body member having a longitudinal axis, the body member having a first end and a second end; a first gripping member connected to the first end of the body member, the first gripping member comprising a first plate for engaging a first structural engaging member; a second gripping member connected to the second end of the body member, the second gripping member comprising a second plate for engaging a second structural engaging member; wherein the body member extends in a direction to intercept each of the first and second plates.

In another embodiment, the body member of the strut bifurcates each of the plates.

In another embodiment, the body member is generally flat.

In another embodiment, the body member comprises a plurality of indented impressions.

In another embodiment, the first and second plates each have a surface defining generally parallel planes. The body member may also extend in a direction to intercept each of the parallel planes, and bifurcate each of the surfaces of the first and second plates. The body member may also bifurcate each of the surfaces of the first and second plates into generally parallelogram shaped segments.

In another embodiment, the body member intercepts the planes of the gripping member forming an acute angle of approximately 45 deg.

In another embodiment, the first and second gripping members each comprise at least one lip, wherein the at least one lip of each of the first and second gripping members is non-planar with respect to the first and second plates. The lip may comprise a plurality of fastening points.

According to another aspect of the invention, a method of making a truss is provided.

In another embodiment, the method comprises providing a plurality of struts each comprising a body member and opposing gripping members at opposing ends of the body member, each gripping member comprising a plate configured to connect to a structural member, the body member intersects each plate; connecting a first strut of the plurality of struts to a first structural member and a second structural member, wherein one of the opposing gripping members of the first strut is connected to the first structural member and the other gripping member is connected to the second structural member; connecting a second strut of the plurality of struts to the first structural member and second structural member, wherein one of the opposing gripping members of the second strut is connected to the first structural member adjacent to the first gripping member of the first strut, and connecting the other gripping member to a second structural member.

In another embodiment, the body member bifurcates each plate.

According to another aspect of the invention, a retainer system is provided.

In an embodiment, the retainer system comprises a base having opposing legs defining a chord receiving area to receive a chord; one or more lateral support arms connected to the base, the lateral support arms each having a supporting surface configured to support one or more solar panels; a central support member defining a fastener receiving channel; a retainer member defining an opening to permit transit of a fastener through the opening to the fastener receiving channel, the retaining member having one or more retaining portions each configured to receive a gasket to seal a junction between the retainer member and one of the one or more solar panels; one or more gaskets each configured to sealingly connect with one of the one or more retaining portions and one of the one or more solar panels; and a fastener to connect the retainer member with the central support member.

In an embodiment of the retainer system, the fastener receiving channel is threaded for receiving a threaded screw.

In another embodiment of the retainer system, the supporting surfaces define a plane parallel to the top surface of the chord.

According to another aspect of the invention, a method of connecting a solar panel to a building structure is provided.

In an embodiment, the method comprises providing retainer system described herein; connecting the chord receiving area to a chord; overlaying a solar panel on one of the one or more lateral support arms; disposing a first gasket between the solar panel and the one lateral support arm; connecting a second gasket to one of the retaining portions and disposing the second gasket between the one retaining portion and the solar panel; fastening the retaining member to the central support member; and connecting a cap to the retaining member.

BRIEF DESCRIPTION OF THE DRAWINGS

In the figures, which depict example embodiments:

FIG. 3 depicts a top perspective view of the strut illustrated in FIG. 1a.

FIG. 12 depicts a method for connecting a solar panel to a chord.

FIG. 18a depicts a side elevation view of window frame from a plurality of trusses, optionally including an air conditioner and an electrical baseboard, according to some embodiments. FIG. 18b is a sectional view along the line AA-AA of FIG. 18A. FIG. 18C is a sectional view along the line BB-BB of FIG. 18B.

FIG. 20A depicts a perspective view of a deck formed from a plurality of trusses including chords and struts supporting deck planks. FIG. 20B is sectional view of the trusses and deck planks of FIG. 20A and along the line BB-BB. FIG. 20C is an enlarged fragmentary view of the connection between the truss and deck plank of FIG. 20B.

DETAILED DESCRIPTION

The present invention provides an improved strut that may be used in conjunction with other structural load bearing members, i.e. beams, to form building structures such as a truss. The improved strut may also form a web tailored to the load requirements of a particular building structure.

Figure 1B:
FIGS. 1b, 1c, and 1d each depict embodiments of a cross sectional view of the strut of FIG. 1a along the line A-A.
Figure 1C:
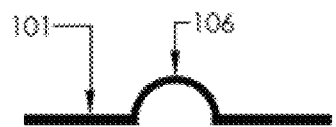
Figure 1D:
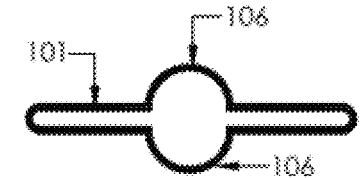
Figure 1A:
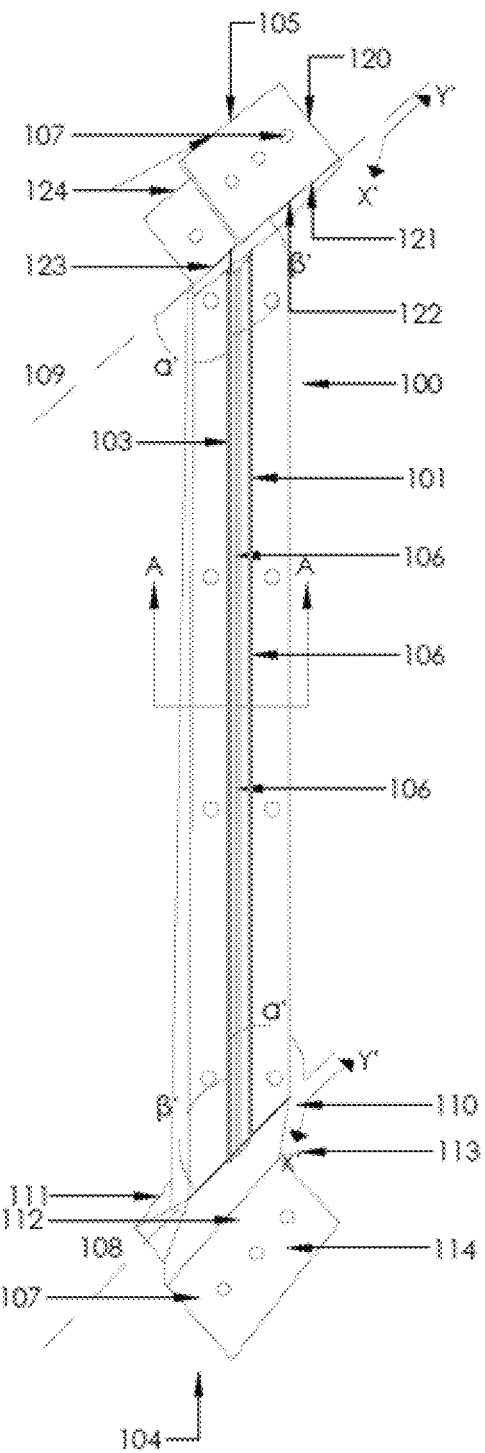
FIG. 1a depicts a side perspective view of a strut according to some embodiments.
Figure 2A:
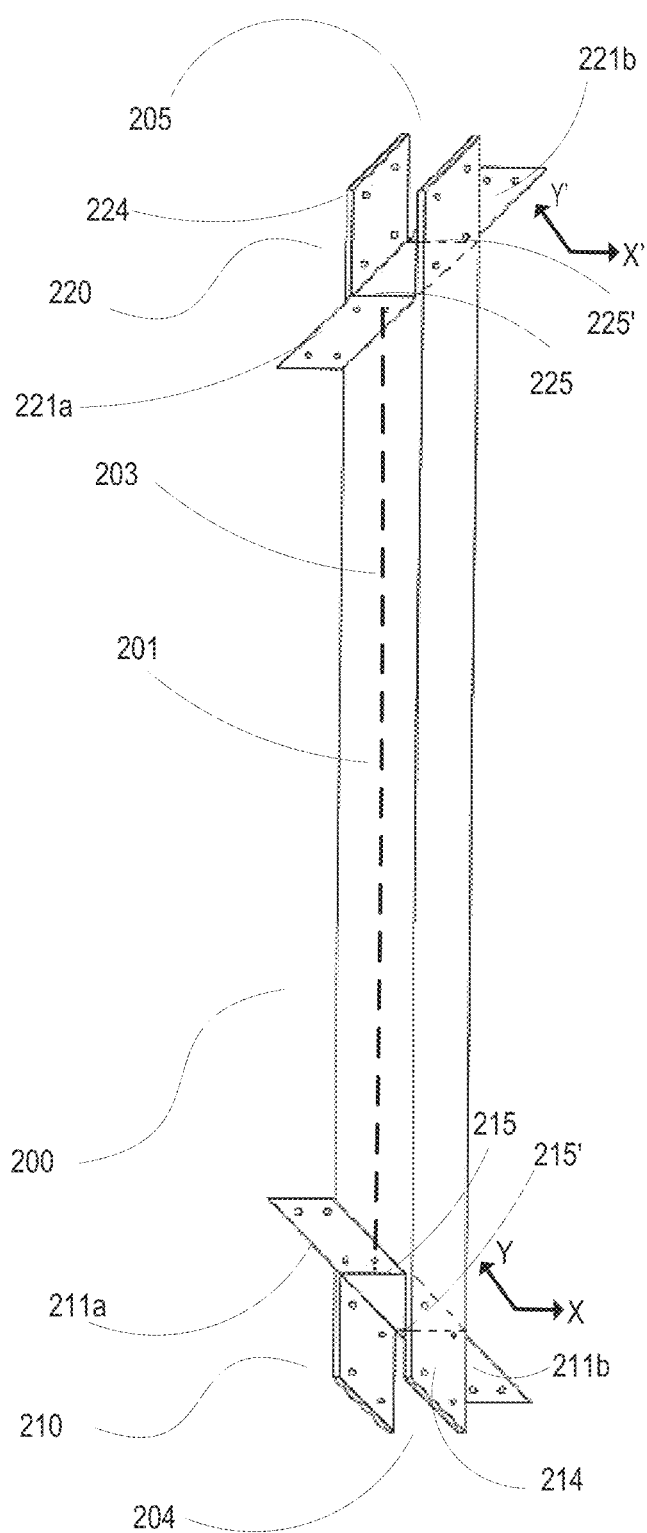
FIGS. 2a, and 2b each depict a perspective views of struts according to some embodiments.
Figure 3:
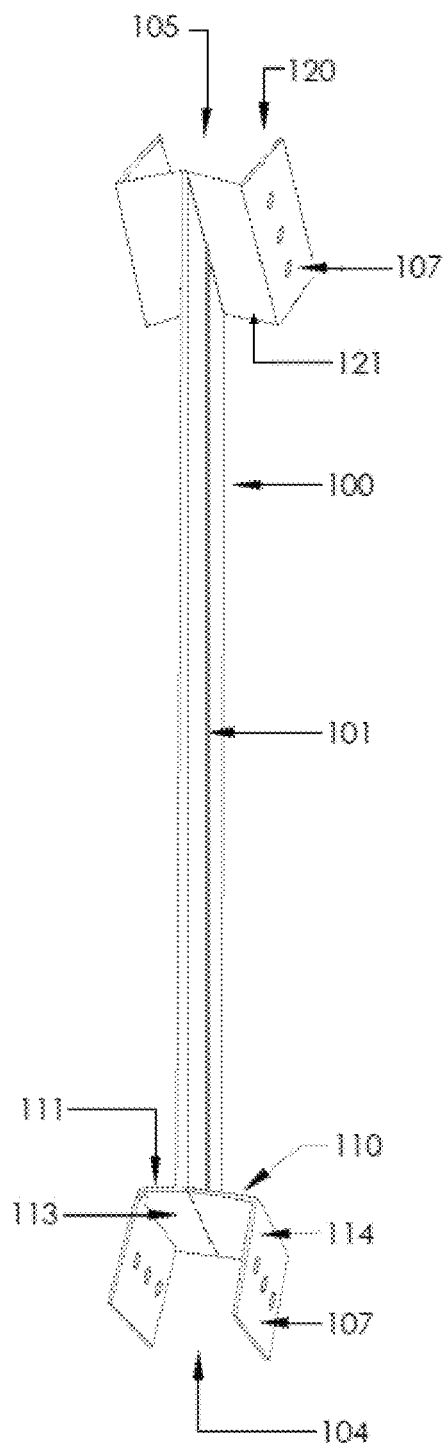

FIGS. 1a and 3 show a strut 100. As depicted strut 100 has a body member 101 having a longitudinal axis 103, the body member 101 having a first end 104 and a second end 105. As shown, body member 101 is generally flat with substantially planar cross section. However, body member 101 may have any other shaped cross-section, e.g. a generally cylindrical cross section. Body member 101 may also comprise one or more indented impressions 106 which are best shown in FIGS. 1b, 1c, and 1d. As illustrated in FIG. 1a, indented impression 106 may extend along the length of the body member 101. Indented impressions 106 may strengthen the body member 101 against bending forces. Indented impressions 106 may have substantially flat or planar cross section as shown in FIG. 1b. Indented impressions 106 may also have an arcuate or hemi-circular cross section as shown in FIG. 1c, or a generally elliptical cross section as shown in FIG. 1d. In an embodiment, body member 101 may be formed from a plurality of general flat members, e.g. plates of material. The plurality of flat members may be connected by any suitable means including welding or fastening members. The shape of the intended impressions 106 may be formed by a single body member 101 or the plurality of flat members as shown in FIG. 2c which illustrated the elliptical cross section of the intended impression 106 form from two flat members.

Figure 4:
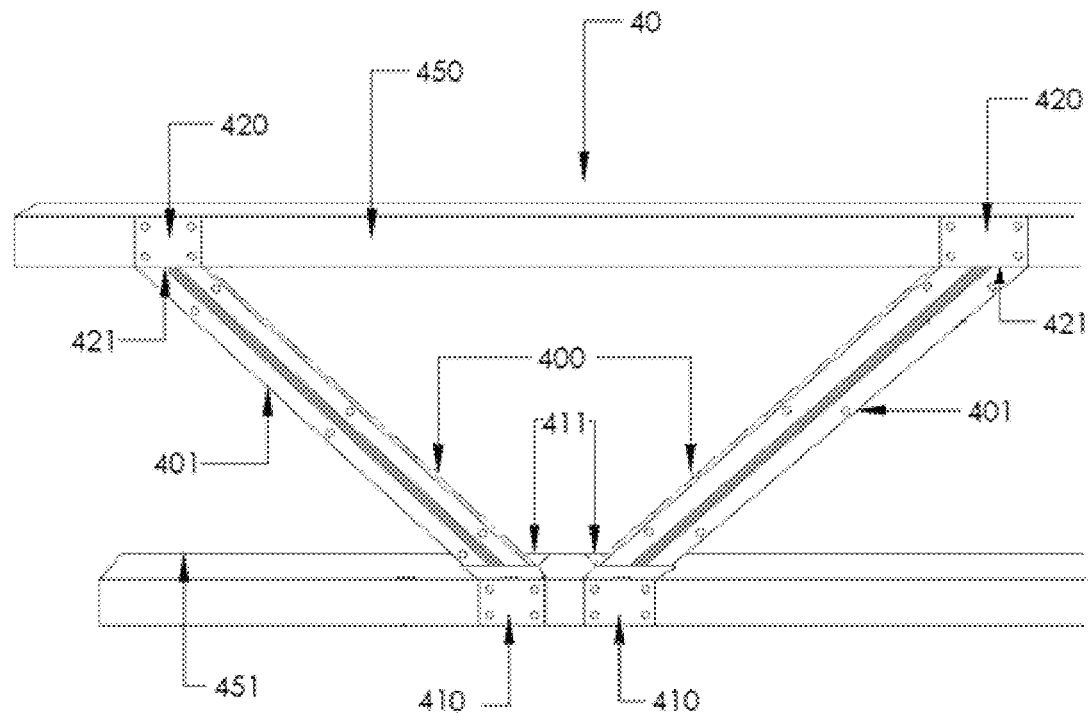
FIG. 4 depicts perspective view of a truss made using a strut according to an embodiment.

As illustrated in FIG. 1a and FIG. 3, a first gripping member 110 is connected to the first end 104 of the body member 101. The first gripping member 110 comprises a first plate 111 for engaging a structural member, e.g. a chord (also referred to as a beam) 450, 451, as illustrated in FIG. 4. The structural members may be square tubing, wood or composite studs, or any other suitable construction material. A second gripping member 120 is connected to the second end 105 of the body member, the second gripping member 120 comprises a second plate 121 configured to engage a second structural member. The body member 101 extends in a direction to intercept each of the first and second plates 111, 121. In an embodiment, body member 101 bifurcates each plate 111, 121. Body member 101 may be configured to bifurcate each plate 111, 121 in a direction parallel to a longitudinal axis of the structural member that plates are configured to connect with. As described herein, the term "bifurcate" or "bifurcation" is defined as dividing a surface to two segments.

In an embodiment, strut 100 may be a unitary construction formed of a single material. The suitability of a given material of a strut will vary depending on the desired design characteristics. Many material selection options may exist for the struts. In an embodiment, the strut may be stainless steel, carbon steel, aluminium, or fibre-reinforced plastic.

When in use, strut 100 is located between two structural members and plates 111, 121 each engage one of the two structural members. For example, a strut may be located between two chords of a building structure as shown in FIG. 4. Compression and shearing forces directed to strut 100 from the structural members is applied to plates 111, 121 from body member 101 which distributes the force to the structural member across a structural member engaging surfaces 113, 123 of plates 111, 121. Body member 101 intersect plates 111, 121 and is configured to transfer force imparted to strut 100 to plates 111, 121. For example, when strut 100 is connected between two structural members, body member 101, as shown in FIG. 1a, bifurcates plates 111, 112 into two portions, each with equal surface areas to distribute force from strut 100 to a structural member over the surface between plates 111, 121 and the structural member.

In an embodiment, body member 101 is flat and intersects plates 111, 112 along lines 108, 109 respectively. Lines 108, 109 may extend generally along the same vector as a structural member connected to plates 111, 112 when strut 100 is in use. In an embodiment, the body member 101 may bifurcate plates 111, 121, to create generally parallelogram shaped segments.

The first and second plates 111, 121 may each have a surface 112, 122 defining a plane X-Y, X'-Y' respectively as illustrated in FIG. 1a. Planes X-Y, X'-Y' defined by surfaces 112 and 122 respectively may be generally parallel such that, when connected to structural members, surfaces 112 would position a structural members connected to plate 111 parallel to a second structural member connected to plate 112. Body member 101 may extend in a direction to intercept each of the parallel planes and bifurcate each of surfaces 112, 122.

In an example, body member 101 may intercept the planes of the gripping member at an angle. As shown in FIG. 1a, body member 101 intercepts plate 111 forming an acute angle α and obtuse angle β, and intercept plate 121 at acute angle α' and obtuse angle β'. When plates 111, 121 have surfaces defining generally parallel planes, angles α, α' are approximately 45 deg. When in use, strut 100 is configured to be connected to two structural members, and compression and shearing forces will be applied to strut 100 and transferred by body member 101 between plates 111, 121. Because body member 101 intercepts plates 111, 121 at an angle, compressive and shearing forces are applied to plates 111, 121 across the surfaces 112, 122, and to structural members connected to plates 111, 121. Distribution of compression and shearing forces over the surfaces of plates 111, 121 to structural members minimizes the forces applied to any fastening members that may connect strut 101 to a structural member.

The first and second gripping members 110, 120 may each comprise at least one lip 114, 124. As shown in FIG. 1a, each of the first and second gripping members 110, 120 comprises two lips configured to cover a portion of the lateral faces of a structural member, e.g. a chord. In an embodiment, lips 114, 124 may be non-planar with respect to the first and second plates 111, 121, e.g. lips may form a right angle with respect to plates 111, 121.

The width of a plate and/or lip may be configured to fit the dimensions (e.g. width and height) of specific structural members. For example, plates 111, 121 may be 2 inch wide and lips 114, 124 may be 4 inch high to connect to a 2×4 beam.

To facilitate connection of strut 100 to a structural member, gripping members 110, 120 may include fastening points 107. Correct location of fastening members to securely couple strut 100 to a structural member is assured by pre-locating fastening point 107, e.g. holes, in the strut 100. As shown in FIG. 1a fastening points 107 may be located in lips 114, 124; however, fastening points 107 may be located in plates 111, 121 or other suitable locations to couple strut 100 to a structural member.

Strut 100 may be connected to a structural member with a variety of fastening member. In an embodiment, screws connect strut 100 to a structural member at fastening points 107.

Figure 2B:
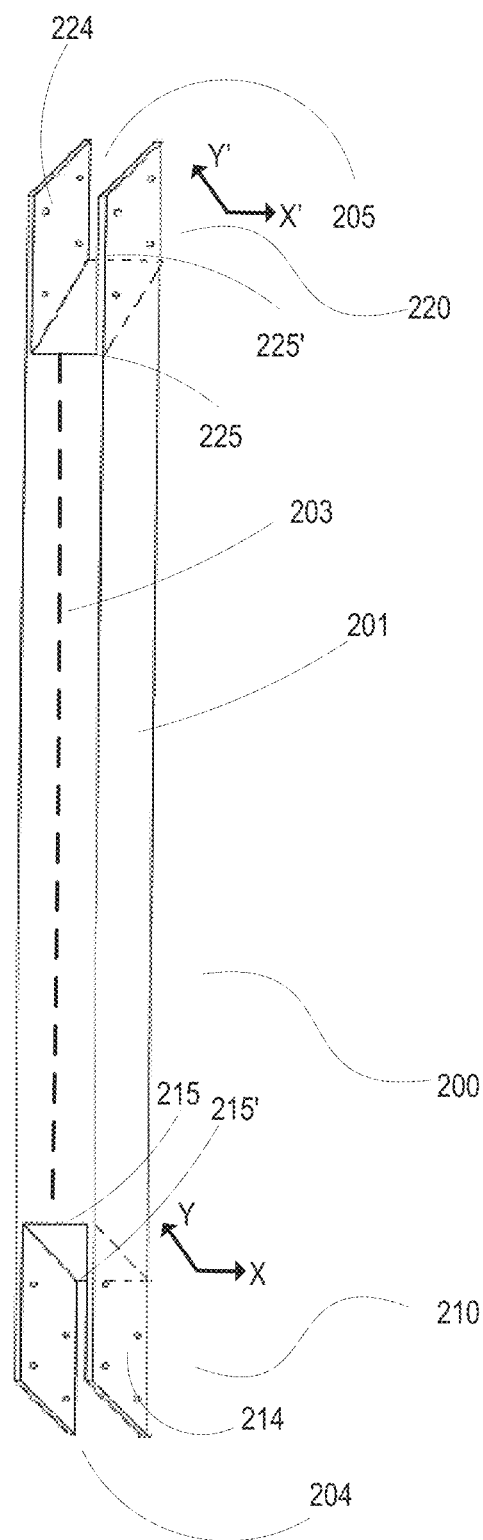

FIGS. 2a and 2b each depict embodiments of a strut according to the invention. Each of the depicted struts may be used to form a roof truss or more specifically the web members connecting a rafter to a tie beam. Strut 200 may have a body member 201 having a longitudinal axis 203, the body member 201 having a first end 204 and a second end 205. Body member 201 may have a quadrilateral cross section, e.g. a substantially rectangular cross section as shown in FIGS. 2a, 2b, which may be hollow. Body member 201 may also comprise a plurality of indented impressions (not shown) defined by a surface of the body member. As discussed above in relation to the embodiment shown in FIG. 1, indented impressions may strengthen the body member 101 against bending forces.

As illustrated in FIG. 2a, a first gripping member 210 is connected to the first end 104 of the body member 201. The first gripping member 210 terminates at edge 215 which intersects first plate 211a, 211b. Edge 215 and first plate 211a, 211b are configured to engage a structural member. In an embodiment, first plate 211a, 211b may bend about edge 215, 215' to engage a structural member. A plane X-Y defined by edges 215, 215' and plates 211a, 211b may correspond to a surface of a structural member to allow strut to engage a surface of the structural member. Typically, the plane X-Y defined by edges 215, 215' and plates 211a, 211b will be at an angle with respect to longitudinal axis 203.

A second gripping member 220 is connected to the second end 205 of the body member, the second gripping member 220 comprises a second plate 221a, 221b configured to engage a second structural member. The body member 201 extends in a direction to intercept each of the first and second plates 221a,b and 221a,b. In an embodiment, first plate 221a, 221b may bend about edges 225, 225' to engage a structural member. A plane X'-Y' defined by edges 225, 225' and plates 221a, 212b may correspond to a surface of the second structural member to allow strut to engage a surface of the second structural member. Plane X'-Y' may be at an angle with respect to longitudinal axis 203. Plane X'-Y' may also be non-parallel with respect to plane X-Y. The first and second gripping members 210, 220 may each comprise at least one lip 214, 224 for connecting to a structural member.

FIG. 2b depicts an embodiment of the present invention similar to the embodiments described above, with reference to FIG. 2a, except that first and second plates 211a, 211b and 221a, 221b are not included. In this embodiment, edges 215,215' and 225, 225', or a surface there between are configured to engage structural members.

FIG. 4 depicts an example truss 40 forming a joist according to an embodiment. A plurality of struts 400 may be connect to and support structural members 450, 451. The plurality of struts 400 may form a web by placing the plurality of struts symmetrically with respect to the structural members, that is, each strut may have a body member intersecting with a structural member engaging plate at a 45 degree angle, and each strut is placed adjacent to another strut to form a "V" shaped web. As shown in FIG. 4, body members 401 of each of the plurality of struts 400 bifurcates the plate 411, 421 of the corresponding strut.

Figure 5:
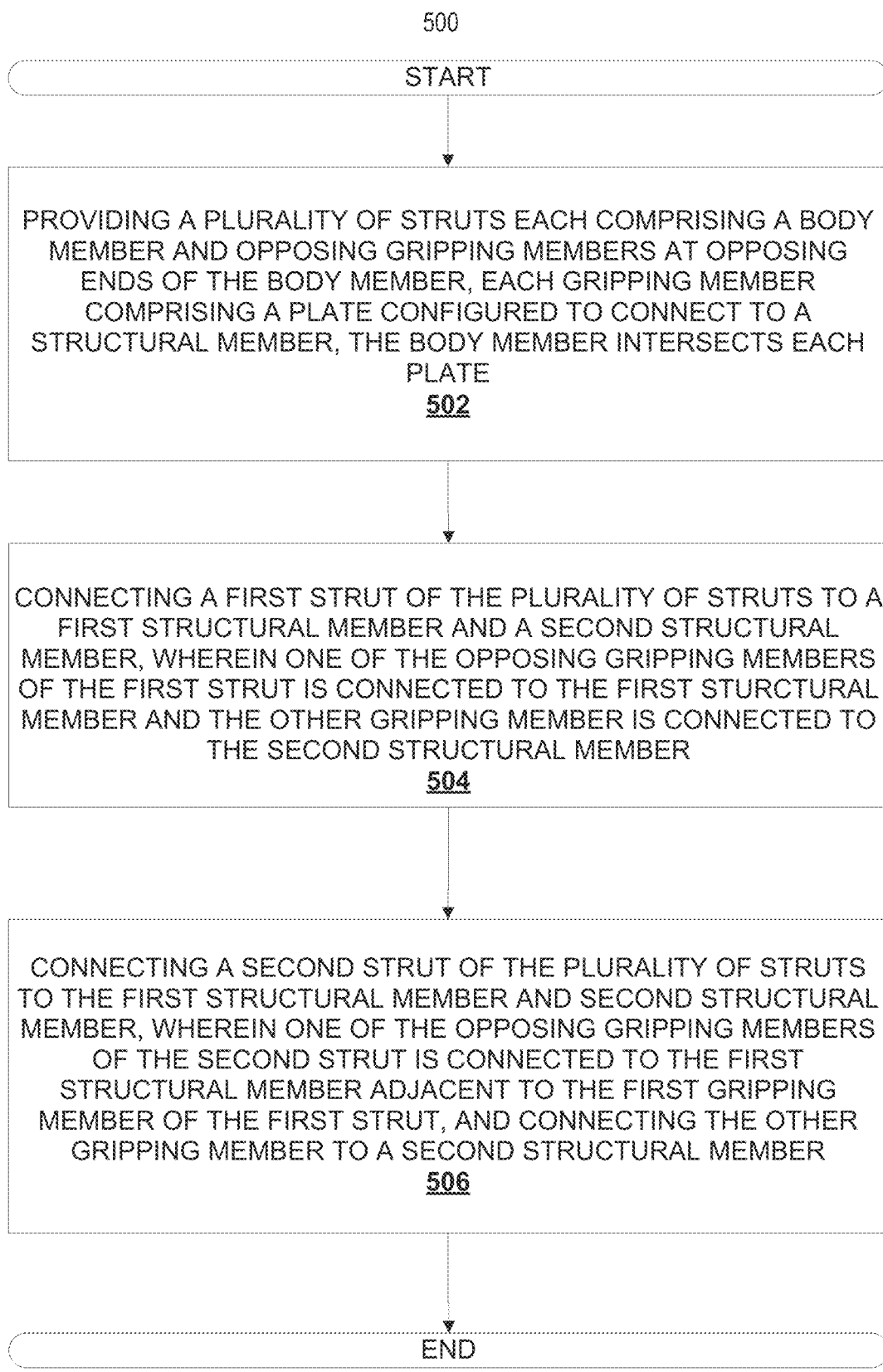
FIG. 5 depicts a method for making a truss according to some embodiments.

FIG. 5 is a flow chart depicting an example method 500 of making a truss 40. Method 500 is described with reference to the embodiment shown in FIG. 4. At block 502, a plurality of struts 400 is provided. Each of the plurality of struts 400 comprises a body member 401 and opposing gripping members 410, 420 at opposing ends of the body member 401. Each gripping member 410, 420 comprises a plate 411, 421 configured to connect to a structural member, e.g. a chord 450, 451. The body member 401 may intersect each plate 411, 421. In an embodiment, the body member 401 bifurcates each of plates 410, 420, for example into parallelogram shaped segments. Body member 401 and plates 411, 421 are configured to distribute compression and shearing stresses applied to each strut across a surface area between the plates 411, 421 and the structural members 450,

451. In another embodiment, the plurality of struts may be one or more of the struts shown in FIG. 1*a*, 2*a*, or 2*b*.

At block 504, a first strut of the plurality of struts is connected to a first structural member 450 and a second structural member 451, wherein one of the opposing gripping members 410, 420 of the first strut is connected to the first structural member 450 and the other gripping member 420 is connected to the second structural member.

At block 506, a second strut of the plurality of struts is connected to the first structural member 450 and second structural member 451. One of the opposing gripping members 410, 420 of the second strut is connected to the first structural member 450 adjacent to the first gripping member 410 of the first strut, and connecting the other gripping member 420 to a second structural member 451.

Figure 14A:
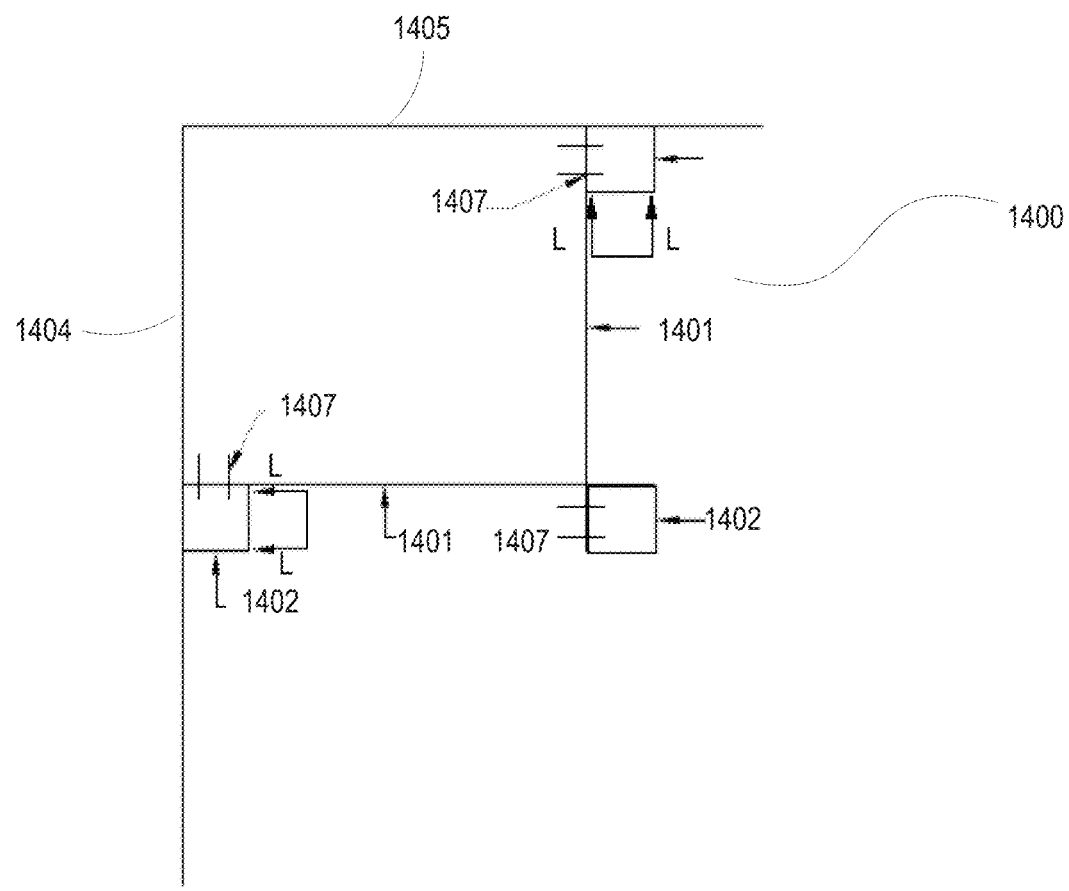
FIG. 14A depicts a bulkhead according to some embodiments.
Figure 14B:
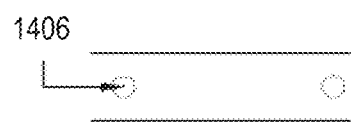
FIG. 14B depicts a cross sectional view of a chord of the bulkhead along the line L-L.

Trusses formed according to embodiments of the invention described herein may form a variety of structures, and may be used for different purposes. For example, trusses according to the present invention may be used to form a bulkhead as illustrated in FIG. 14A. Each of the trusses may be connected to chords 1402 by fasteners which may be passed through pilot holes 1407 which are formed in each chord. FIG. 14A also depicts bulkhead 1400 which includes trusses 1401 connecting chords 1402. Chords 1402 may be made from gauge galvanized PRE, among other construction materials. As shown, trusses 1401 are aligned at a right angle to form a square or rectangular shaped bulkhead which may be connected to wall 1404 and ceiling 1405 to form a bulkhead. Chords 1402 and trusses 1401 may be connected to walls and ceiling 1405 by fastening members threaded through holes 1406 defined by each chord.

Figures 15A, 15B:
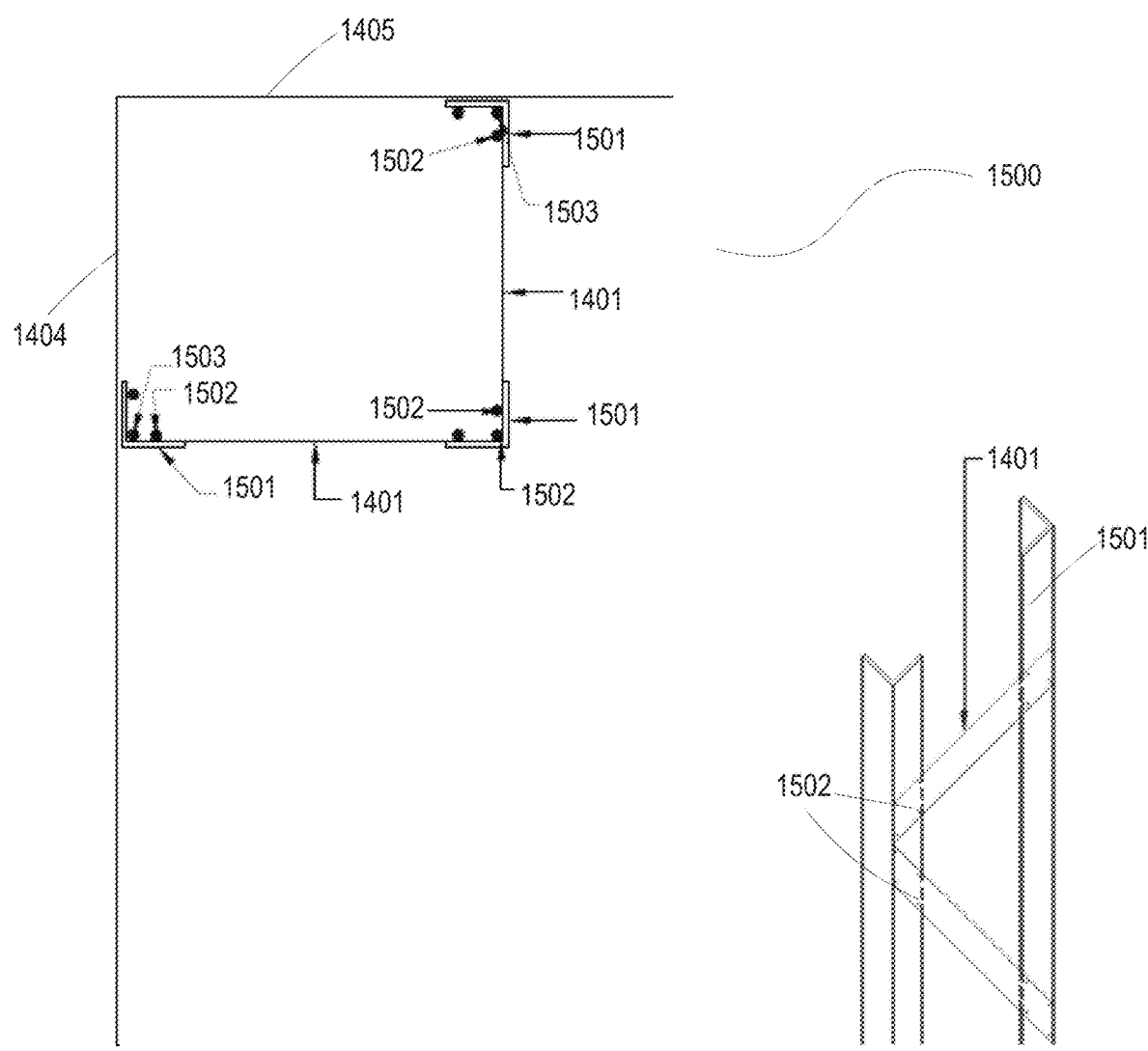
FIG. 15A depicts a bulkhead according to some embodiments, the bulkhead formed from trusses including angles and struts.
FIG. 15B depicts a perspective view of a truss of FIG. 15A.

FIG. 15A depicts an another embodiment of a bulkhead 1500. Each of the trusses 1401 may be connected to angles 1501 by fasteners passed through holes 1502 defined by each angle. Angles 1501 and trusses 1401 may be connected to walls and ceiling 1405 by fastening members threaded through holes 1503 defined by each angle. As shown, each truss 1401 is aligned at a right angle to form a square or rectangular shaped bulkhead.

Figure 16:
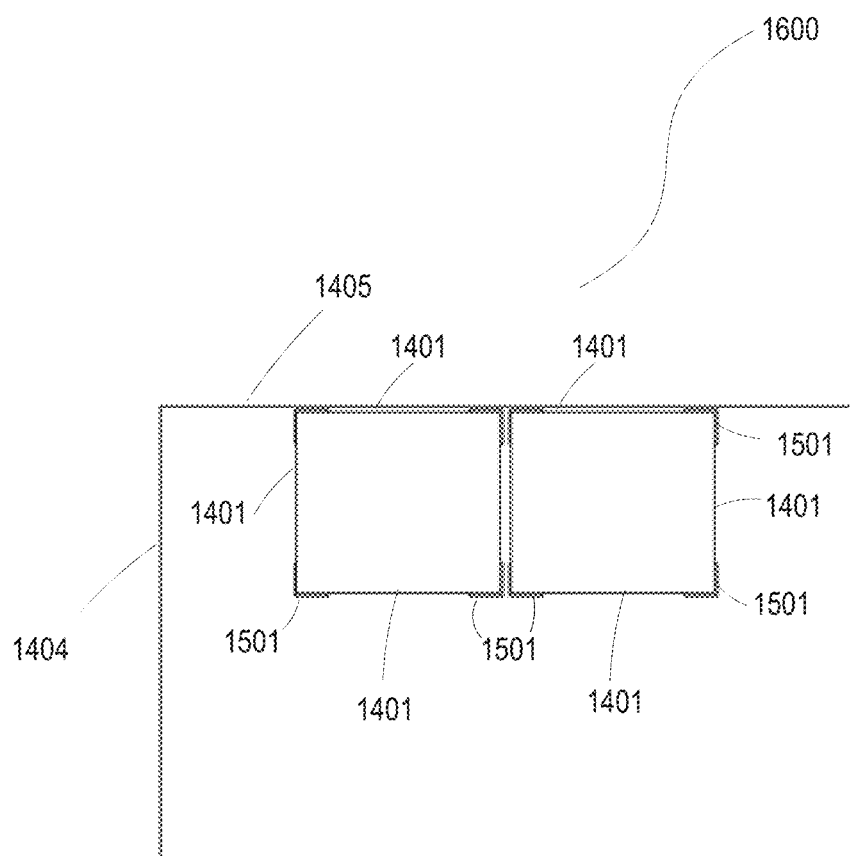
FIG. 16 depicts a plurality of bulkheads formed from a plurality of trusses including angles and struts according to some embodiments.

FIG. 16 depicts another embodiment of a bulkhead 1600. As shown in FIG. 16, bulkhead 1600 may be formed from a plurality of trusses 1401 forming each side of a bulkhead having a square or rectangular cross section. Each of the plurality of trusses includes may include struts described herein connected to angles 1501 or chords (not shown) to form each of the trusses. Similar to the embodiments described in FIG. 14A and FIG. 15A, each bulkhead 1600 may be connected to ceiling 1405 or wall 1404 with fastening members (not shown).

Figure 6A:
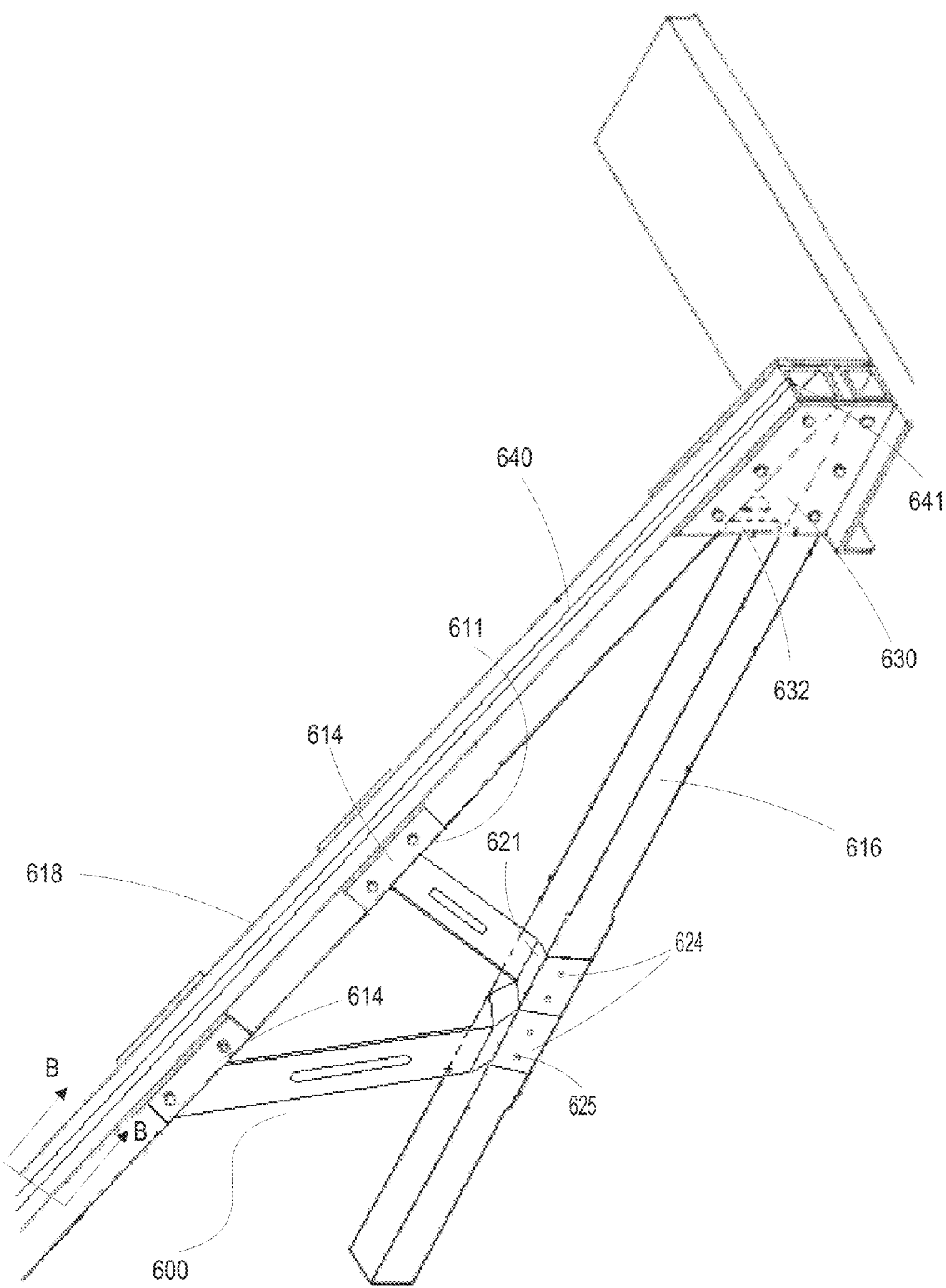
FIG. 6a depicts chords forming a truss and gusset plate according to some embodiments.
Figure 6B:
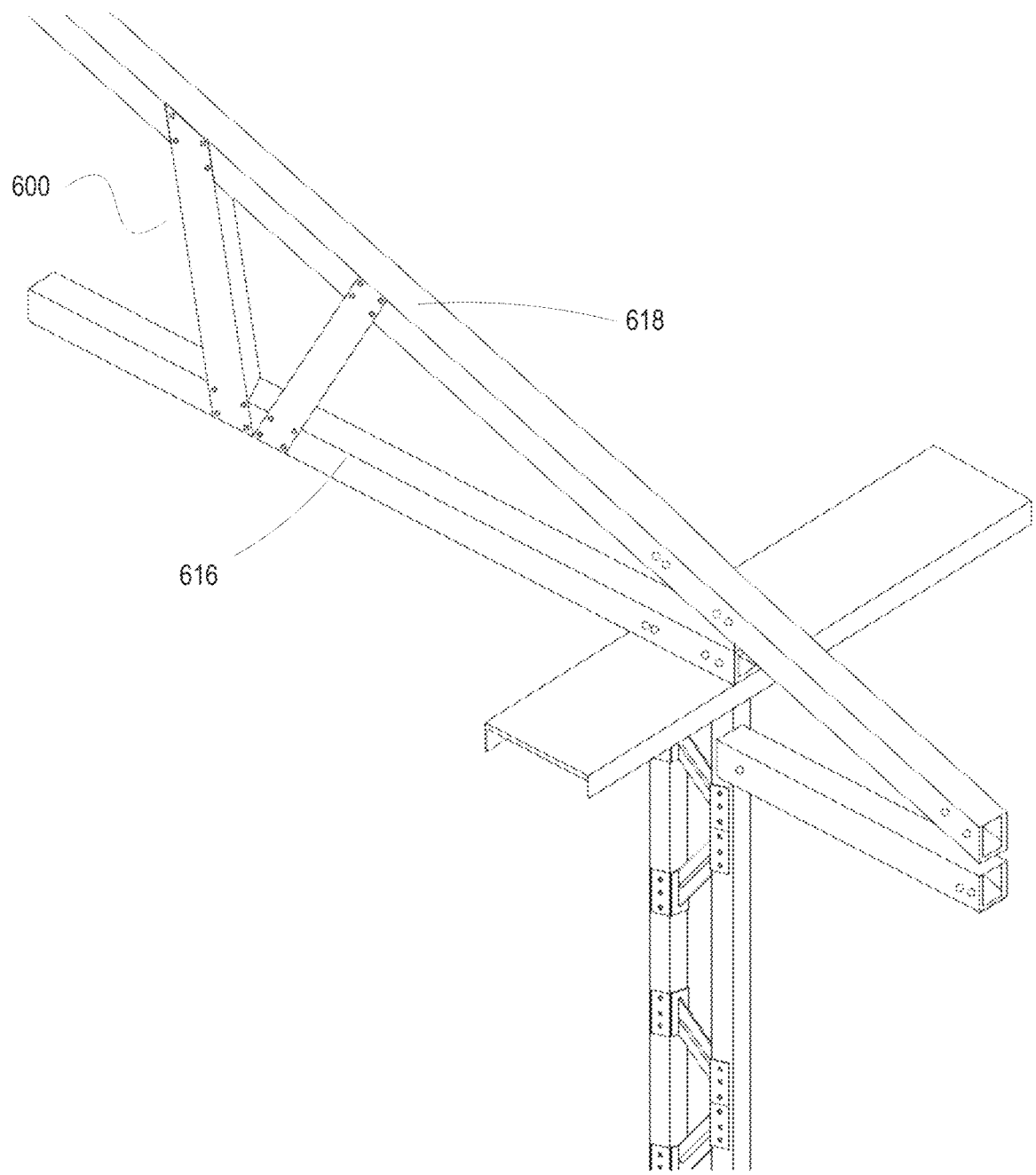
FIG. 6b depicts chords forming a truss according to some embodiments.

FIGS. 6*a* and 6*b* depicts chords of tie beam 616, rafter 618, and struts 600. Tie beam 616, rafters 618, and struts 600 form a truss. As shown, struts 600 in FIG. 6*a* are similar to those illustrated in FIG. 1*a*. Other struts such as strut 200, depicted in FIG. 2*a* and FIG. 2*b*, may also be used to form the truss as shown in FIG. 6*b*. Plates 611, 621, tie beam 616, and rafter 618 all have the same outer cross-sectional dimensions. Lips 614, 624 are thus flat and perpendicular to plates 611, 621.

The lips 614, 624 are affixed against movement with respect to the chords of the tie beam or a rafter, as the case may be, by fasteners, e.g. nut and bolt combinations 625. In a fully assembled truss, the struts are fixed against movement with respect to the other members of the truss. If one of the two bolting arrangements holding a strut in placed is not engaged then the strut can 30 be pivotally moved about the axis of the remaining bolt holding it between the lips 614,624.

End connectors are provided by gusset plates 630. Gusset plates 630 are shaped to accommodate the configuration of the chords fastened to it in a fully assembled truss, which may provide strengthening effect to gusset plates 630. Gusset plates 630 are generally flat, but can include bent portion 632 which acts as a stiffener for gusset plates 630. Predrilled holes of gusset plates 630 are drilled along upper and lower lines which match the rise/run of a rafter with respect to the lower tie beam.

Figure 7:
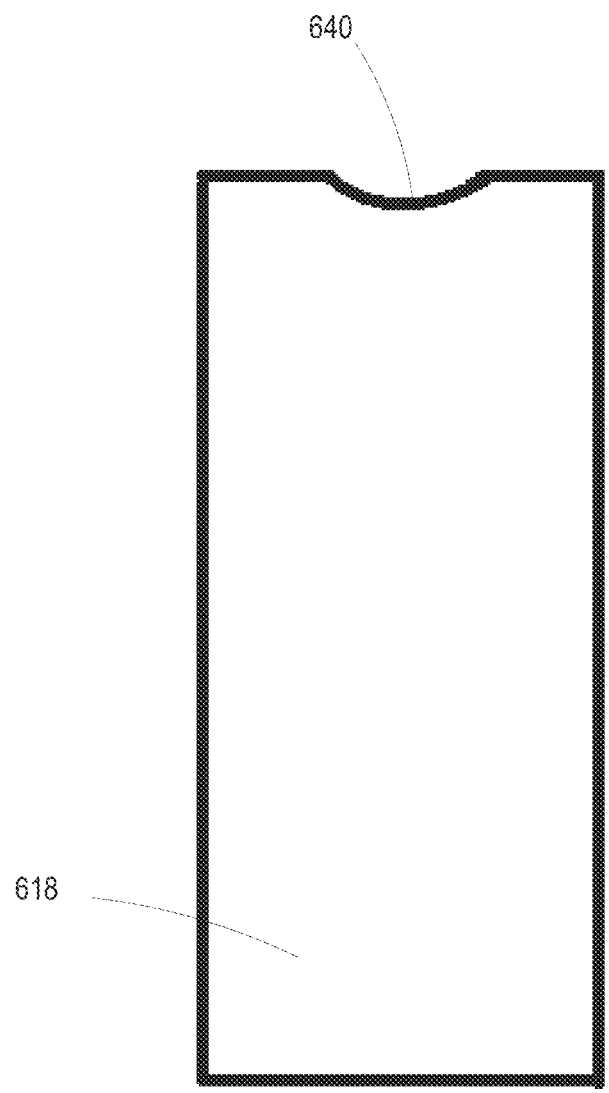
FIG. 7 depicts a cross sectional view of a chord of FIG. 6a along the line B-B.

In an embodiment, channel 640 may be formed in a surface of rafter 618 and extend along the longitudinal length of the rafter. Channel 640 may be configured to funnel fluid, e.g. water, toward an end 641 of rafter 618 by having a gradient. Rafter 618 may be configured to receive a solar panel (not shown) to overlay the solar panel on rafter 618. Edge of the solar panel may be adjacent to channel 640 to allow fluid flowing over the solar panel to flow into channel 640. Channel 640 is illustrated in FIG. 7 which depicts a cross sectional view of rafter 618 along the line B-B.

Figure 8:
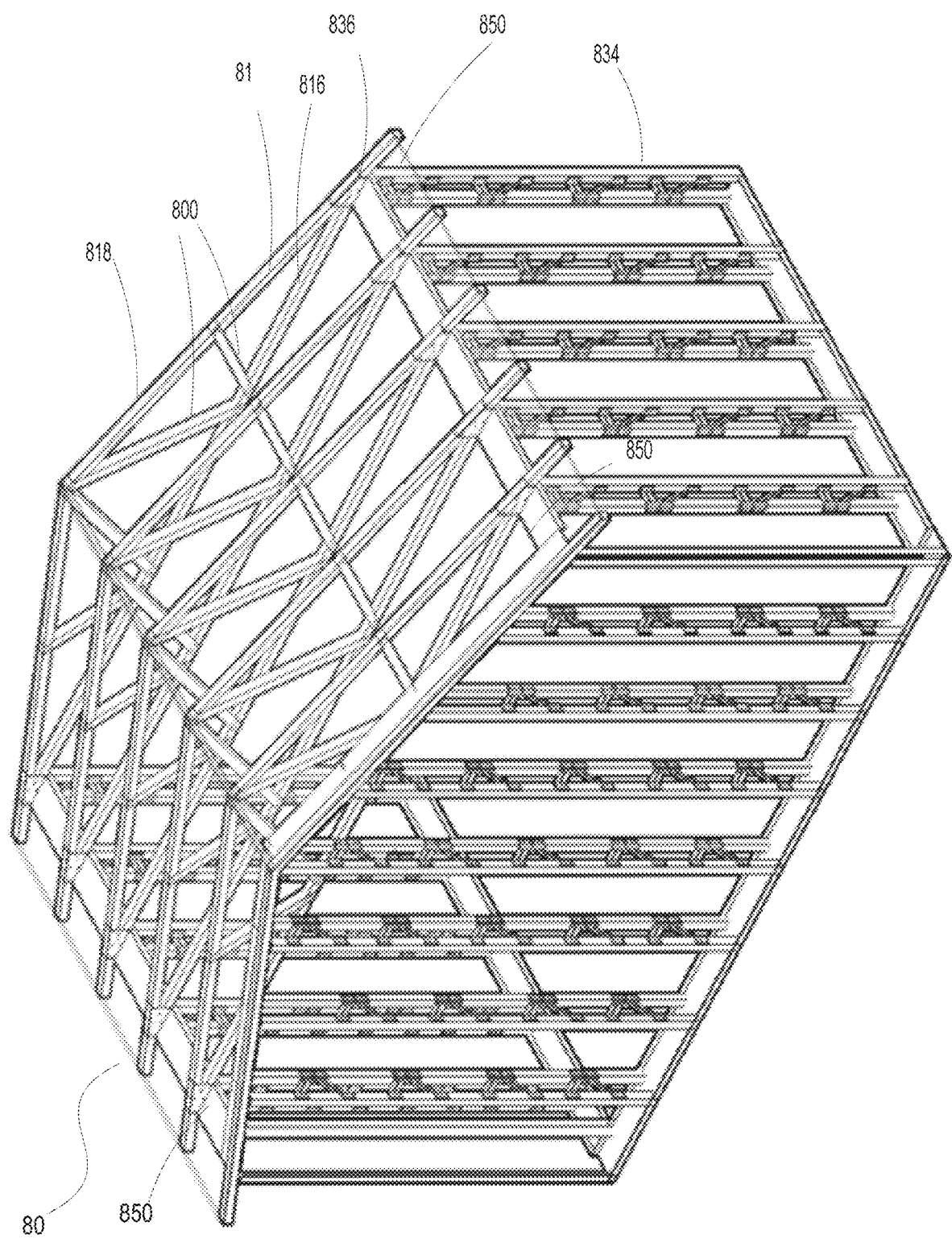
FIG. 8 depicts a building structure according to some embodiments.

FIG. 8 depicts trusses according to an embodiment of the invention. In particular, FIG. 8 shows structural components of a building structure 80 incorporating a truss 81. Trusses 81 may be pre-assembled at the factory or other off-site location and then transported for final assembly and incorporation into the building structure. Struts 800 may also be fabricated for assembling truss 81 at the factory or other location. Once at the desired site of the building, struts 800 may be fastened to the tie beam 816 and rafters 818 by fasteners, e.g. nut and bolt combinations, a gusset plate is installed and the truss fastened atop vertical support studs 834 by connecting means such as a bolt which extends vertically through the tie beam to anchor 836 fastened between parallel upright chords of the supporting studs 834.

One or more solar panels 850 may be overlaid onto rafter 818 of trusses 81. Solar panels 850 may overlay one or more rafters 818 which may support solar panels 850 along their length. As shown in FIG. 8, solar panel 850 may be transparent or translucent allowing light to pass through the solar panel 850. In an embodiment, building structure 80 may be a green house where the one of more solar panels 850 form the at least a portion of the roof. Solar radiation penetrating through the solar panels 850 may be used to heat the green house. Electricity generated by the solar panels may be used to provide supplemental heat to the green house, stored for later use (e.g. to heat the greenhouse), or transmitted to an electric grid.

Figure 9:
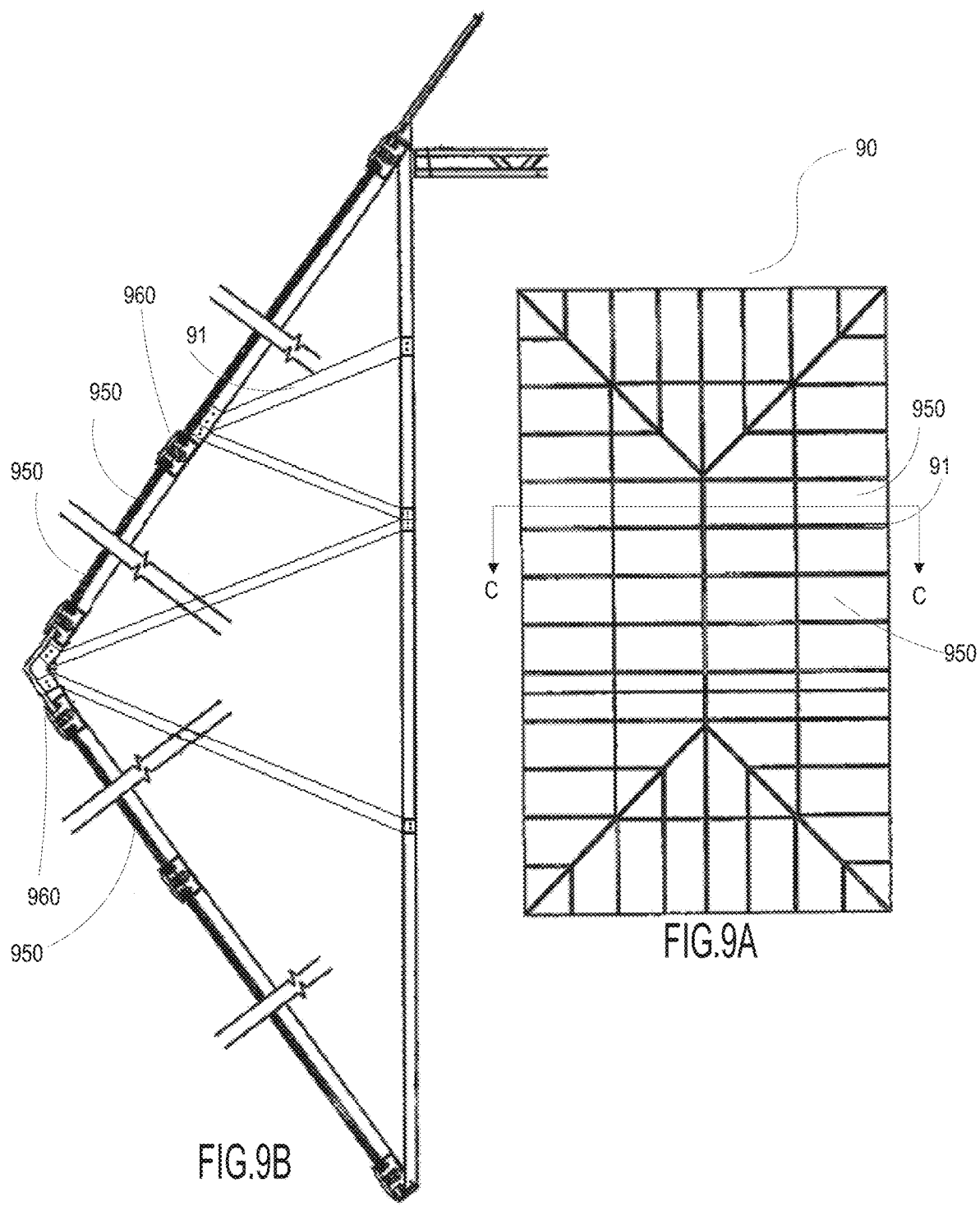
FIG. 9A depicts top view of a building structure.
FIG. 9B depicts a cross sectional view of the building structure of FIG. 9A along line C-C.

FIG. 9A depicts top view of a building structure 90 having solar panels 950 overlaid onto trusses according to the present invention. FIG. 9B depicts a cross sectional view along line C-C illustrating a side view of trusses according the present invention. Retainer systems 960 connect solar panels 960 to the rafters of trusses 91. One or more retainer systems 960 may be spaced along the length of each solar panel to connect the solar panels 960 to one of trusses 91.

Figure 10:
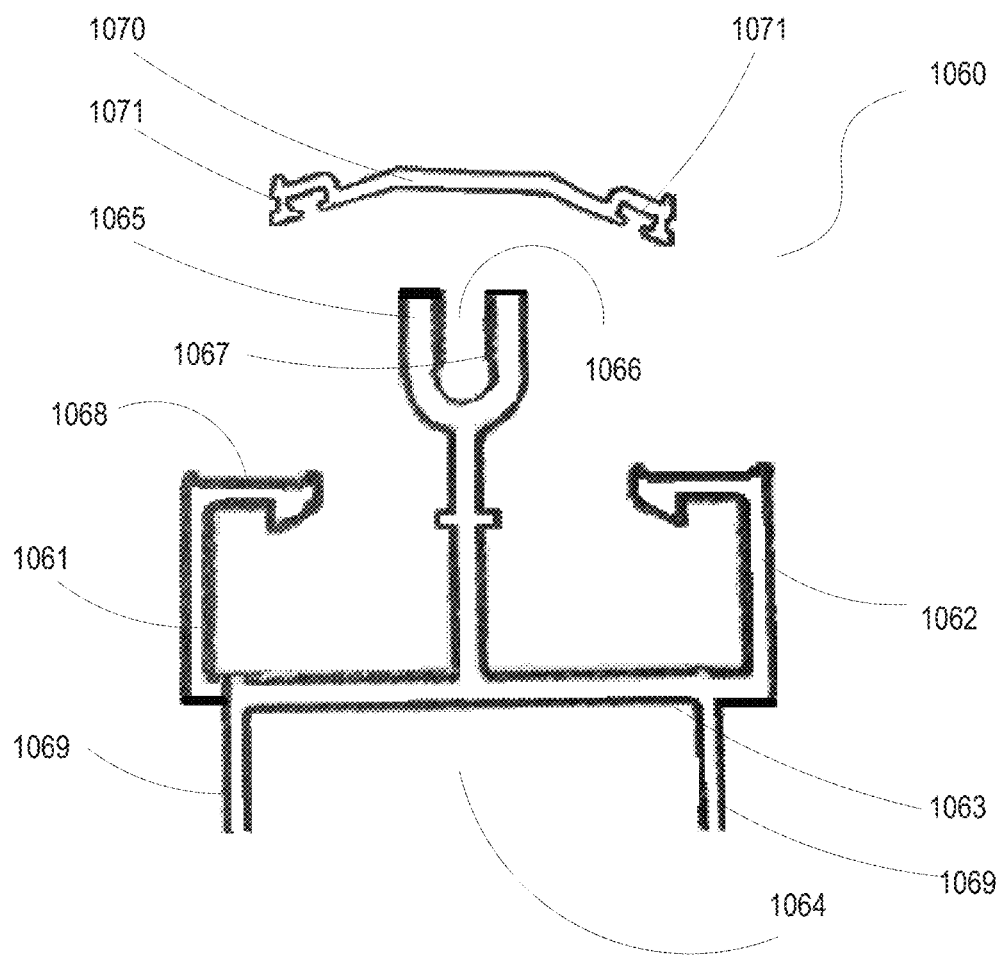
FIG. 10 depicts a side view of a retainer system according to some embodiments.

FIG. 10 depicts a retainer system 1060 according to an embodiment. Retainer system 1060 may have lateral support arms 1061, 1062 connected to base 1063. Lateral support arms 1061, 1062 are configured to support solar panels. As shown in FIG. 10, two opposing lateral support arms 1061, 1062 are connected to base 1063 which is configured to connect with a chord of a building structure. Each lateral support arm may have supporting surface 1068 for receiving a solar panel. Supporting surface 1068 may be configured to define a plane parallel to a plane defined by the top surface of a chord. While the embodiment illustrated in FIG. 10 depicts two lateral support arms, retainer system 1060 may comprise one or more support arms to satisfy design configuration that may include the number of solar panels that need to be supported, and the weight of each solar panel.

Figure 11:
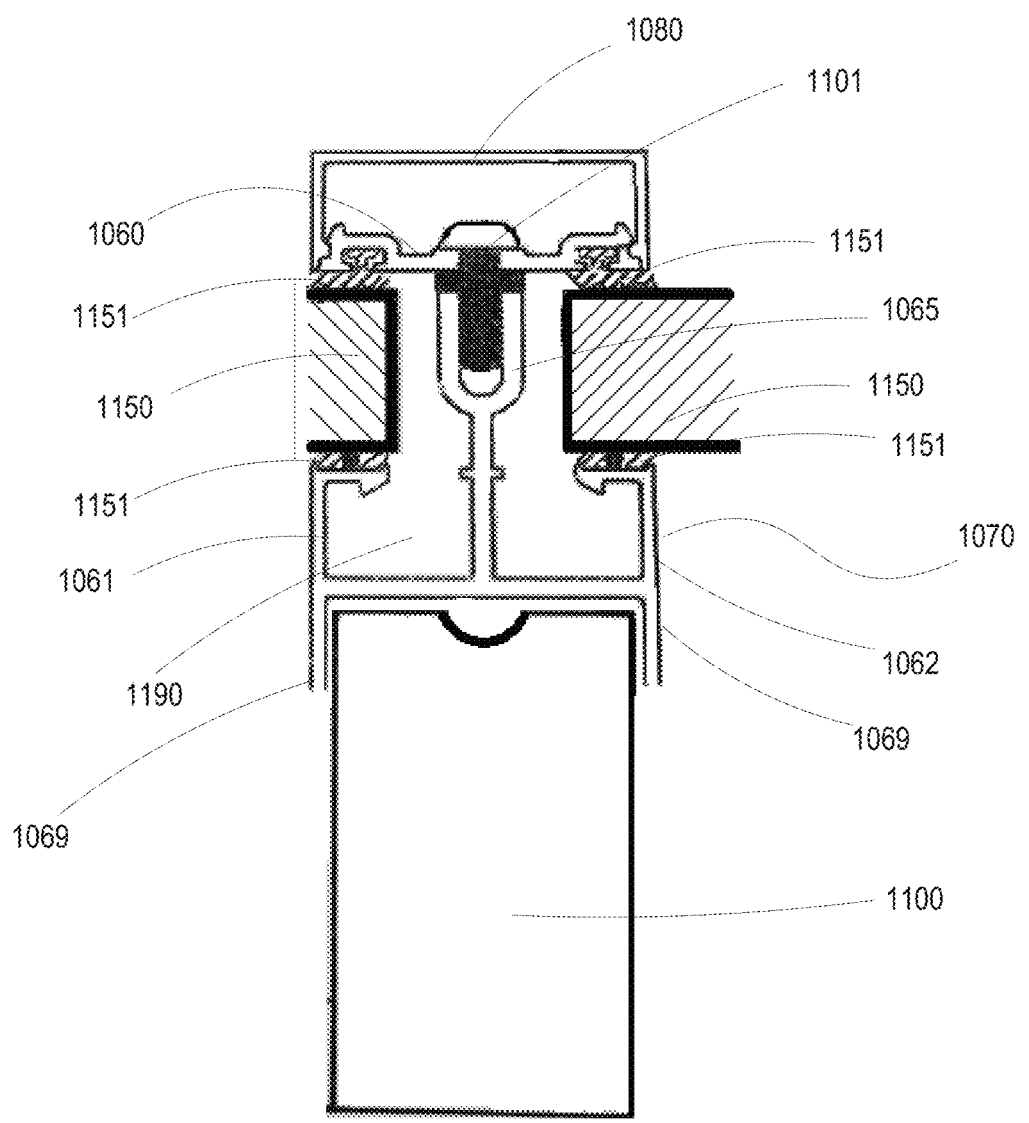
FIG. 11 depicts a side view of a retainer system according to some embodiments connecting solar panels to a chord.

In an embodiment, opposing legs 1069 extending from base 1063 define a chord receiving area 1064 which may be configured to receive a chord to secure retainer system 1060 to the chord (shown in FIG. 11). Opposing legs 1069 may define a plurality of holes for receiving a fastener, e.g. a nail, screw, bolt, etc., to attached base 1063 to the chord 1100. In an embodiment, opposing legs 1069 may be configured to connected with chord 1100 by friction fitting. Retainer system 1060 may also have a central support member 1065 defining a fastener receiving channel 1066. An internal surface 1067 of central support member 1065 may be threaded for receiving a fastening member, e.g. a screw. The retainer system may extend the length of the solar panel.

Retainer system 1060 may also include a retainer member 1060 defining an opening (not shown) to permit transit of a fastener therethrough to fastener receiving channel 1066. Retainer member 1070 may also have retaining portions 1071 configured to receive a gasket to seal a junction between retainer member 1070 and a solar panel. As shown in FIG. 10, base 1063, lateral arms 1061, 1062 and central member 1068 may form a continuous structure, whereas retainer member 1060 may be a separate element. In another embodiment, retainer member 1060 may also be part of a continuous structure with the other elements of retainer member 1070.

FIG. 11 depicts retainer system 1070 connected to solar panels 1150 and chord 1100. Chord 1100 may be upper most chord of a truss (i.e. a rafter) that forms the support for solar panels 1150 which are overlaid onto the chord. As shown, retainer system 1070 is connected to chord 1100, and solar panels 1150 are overlaid onto lateral arms 1061, 1062 of retainer system 1070. Gaskets 1151 are placed between solar panels and lateral arms 1061, 1062 to sealingly couple the solar panels 1150 with retainer system 1070. Similarly, gaskets 1151 may also be placed between retainer member 1060 for sealing engagement. Gaskets may be made of a resilient deformable material to provide a protective barrier between the solar panels and the lateral arms or the retainer member to prevent damage to the solar panel. Gaskets may also be made from an insulator to provide thermal protection the solar panel. Retaining portion 1071 of retainer member 1060 may be configured to connect with gaskets 1151 by snap connection, slidable engagement, or any other suitable means. Fastener 1101, e.g. a screw, is placed through an opening of retainer member 1060 to engage central support member 1065. Fastener 1101 may have a surface having a threaded connection to engage with an internal surface 1067 that is threaded of central support member 1065. In an embodiment, cap 1080 may be configured to connect to retainer member 1060 by snap connect, slidable engagement, or any suitable connection means. Cap 1080 may provide a seal to resist air flow and moisture migration to fastener 1101 and the opening defined by retainer member 1060, which allows the cavity 1190 defined by the retainer system 1070 and solar panel 1150 to act as an insulative barrier.

FIG. 12 is a flow chart depicting an example method of connecting a solar panel to a chord. Method 1200 is described with reference to the embodiments shown in FIG. 10 and FIG. 11. At block 1202, a retainer system is provided. The retainer system comprises a base defining a chord receiving area configured to receive a chord, and one or more lateral support arms that are connected to the base. Each lateral support arm has a supporting surface configured to support one or more solar panels. The retainer system also includes a central support member defining a fastener receiving channel, and a retainer member defining an opening to permit transit of a fastener through the opening to the fastener receiving channel. The retaining member has one or more retaining portions each configured to receive a gasket to seal a junction between the retainer member and one of the one or more solar panels. One or more gaskets may also be provided, each configured to sealingly connect with one of the one or more retaining portions and one of the one or more solar panels. A fastener may also be provided to connect the retainer member with the central support member.

At block 1204, the chord is connected to the cord receiving area of the base. Optionally, fasteners may be used to attach the opposing legs of the base with the chord.

At block 1204, a first gasket is disposed between the solar panel and a lateral support arm.

At block 1206, a solar panel is overlaid on the lateral support arm.

At block 1208, a second gasket is connected to one of the retaining portions. The second gasket is then disposed between the one retaining portion and the solar panel.

At block 1210, the retaining member is fastener to the central support member.

At block 1212, the cap is connected to the retaining member.

Figure 13:
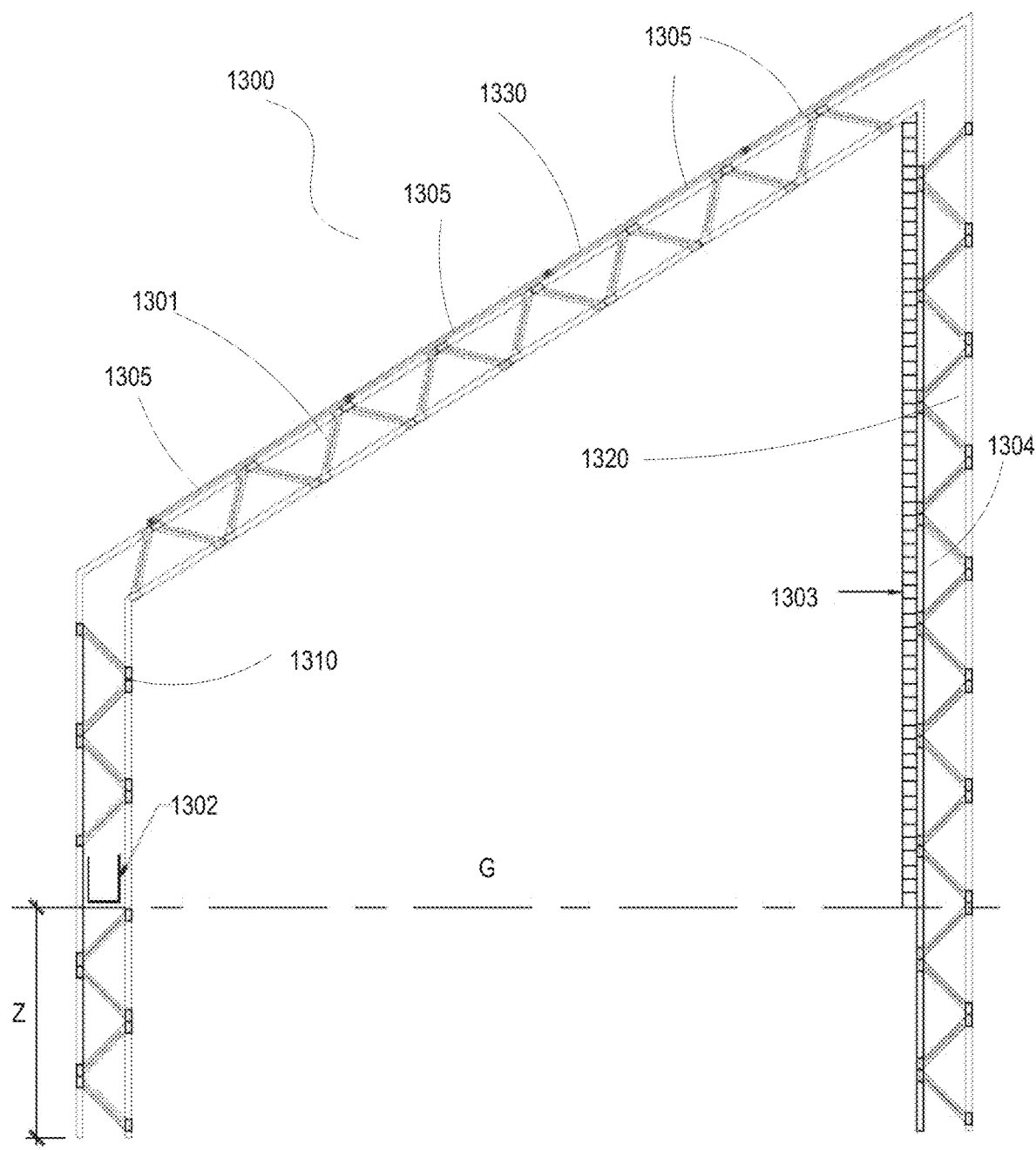
FIG. 13 depicts a greenhouse according to some embodiments.

FIG. 13 depicts a greenhouse 1300 for growing vegetation according to some embodiments. Greenhouse 1300 may have opposing wall 1310, 1320 connected by a roof 1330. Walls 1310, 1320, and roof 1330 may each comprise a plurality of trusses 1301 including struts described above. Roof 1330 may have one or more solar panels 1305 overlaid onto trusses 1301, the solar panels 1305 defining an enclosed area of greenhouse 1300. To enable light to pass into the greenhouse, the solar panel 1305 may be transparent or translucent, and an insulator configured to resist heat loss from the greenhouse. The roof 1330 may also be free of roof sheathing, shingles, insulation, draw wall, and other structures that would interfere with light passing into the greenhouse. The solar panels 1305 may be overlaid onto trusses according to the methods described herein, in particular according to the method described in FIG. 12. The uppermost surface of the greenhouse may comprise solar panels 1305 and the retainer system described herein. In an embodiment, one or more of the solar panels 1305 may be substituted with generally translucent or transparent material such as glass, polyethylene, or polycarbonate. As such, roof 1330 may comprise solar panels, transparent or translucent material (e.g. glass, polyethylene, polycarbonate, etc.), or a combination of both. Roof 1330 may be a single slope roof as shown in FIG. 13 or a roof according to any other design, e.g. dual sloped roof shown in FIG. 8.

Walls 1310, 1320 may extend below grade G by length Z. In an embodiment, length Z may be about four feet. Wall 1310 may include a bladder 1302 which may be filled with fluid, e.g. water. Bladder 1302 is configured to regulate the temperature inside the greenhouse 1300 by absorbing heat when greenhouse 1300 temperature or the ambient temperature is greater than the fluid temperature in bladder 1302, e.g. during daylight hours, and discharging heat when the bladder 1302 temperature is greater than the temperature inside the greenhouse 1300. Bladder 1302 may be made of a resilient material to allow fluid within the bladder to expand or contract.

To reduce heat loss from greenhouse 1300, cavities 1304 within wall 1320 may contain insulation. Insulation may be mineral wool, spray foam, or any other insulation. An interior surface of wall 1320 may also include thermal mass 1303, e.g. heat absorbent brick, that is configured to absorb solar radiation passing through solar panels 1305. Energy absorbed thermal mass 1303 is radiated back to greenhouse 1300 as heat.

Figure 17:
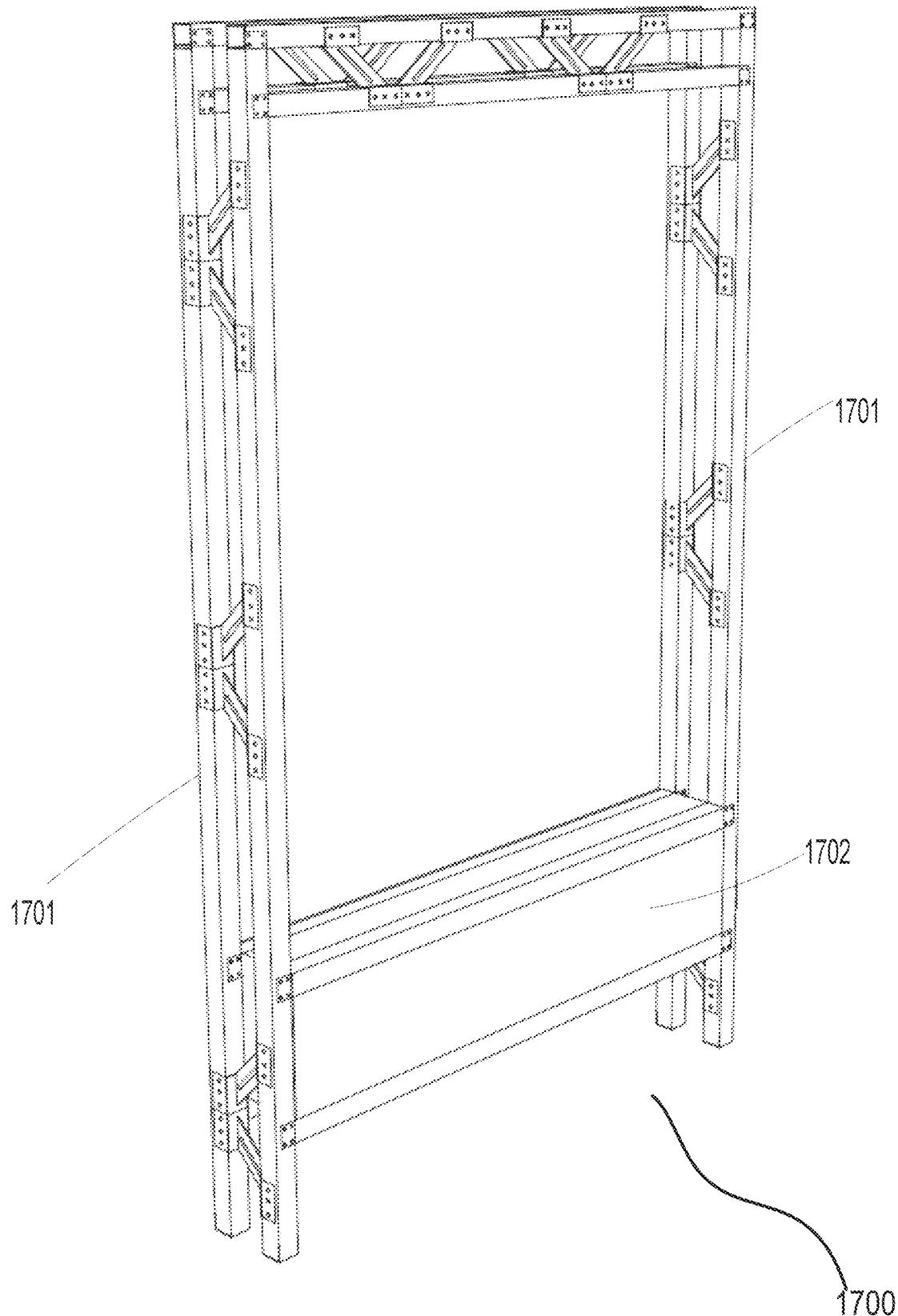
FIG. 17 depicts a perspective view of a window frame formed from a plurality of trusses, optionally including a heat pump, according to some embodiments.
Figure 19:
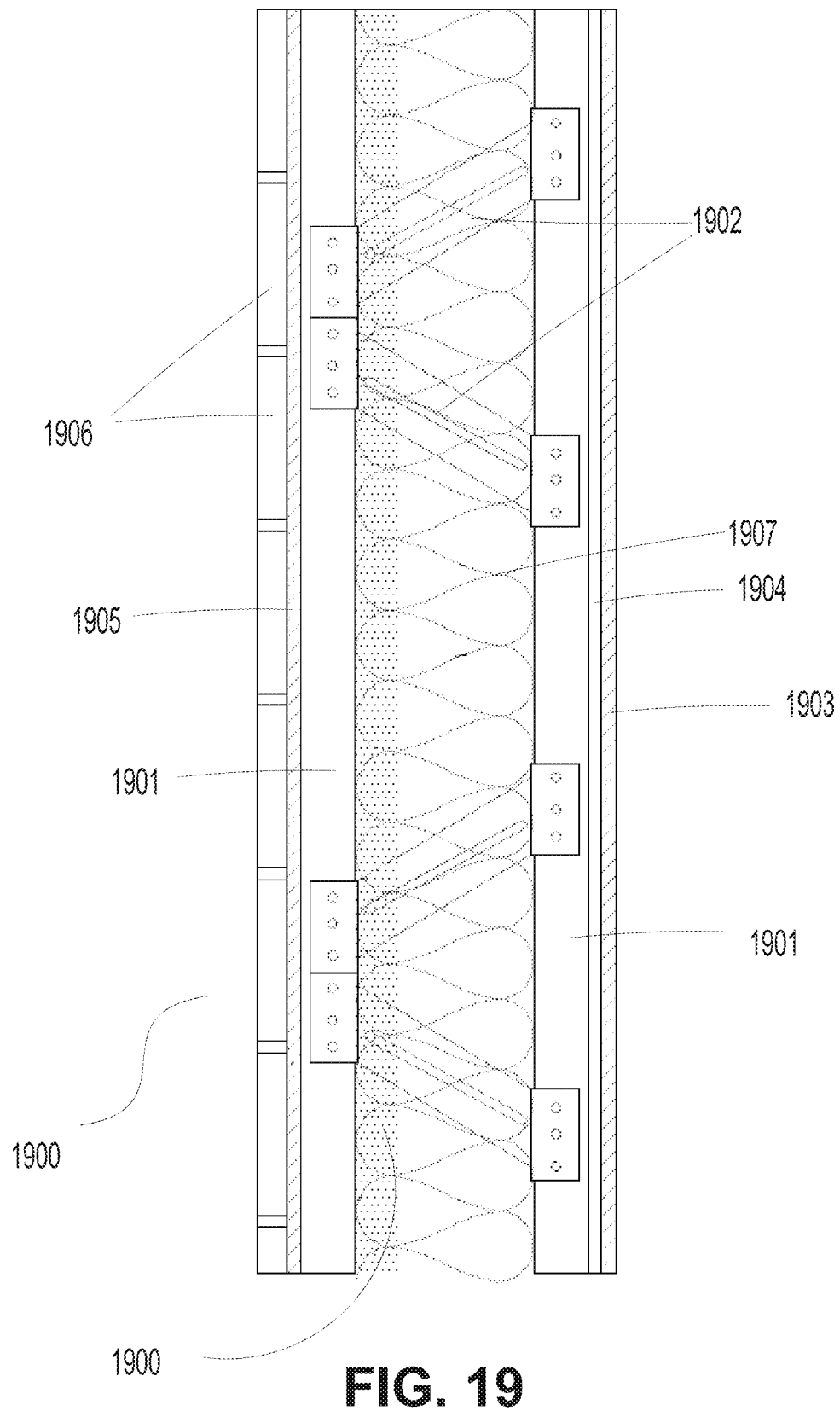
FIG. 19 depicts a side elevation view of a wall formed from a plurality of trusses according to some embodiments.

Other example structures that may be formed from the struts and trusses according to embodiments of the invention are illustrated in FIGS. 17, 18A-C, 19, 20A-C, and 21A-B. FIG. 17 depicts window frame 1700 formed by a plurality of trusses 1701 described herein which may define an area of a heat pump 1702 for heating and air conditioning. FIG. 18A depicts another embodiment of a window frame 1800 formed from a plurality of trusses 1801 defining an air conditioner 1802 in an upper portion of the frame and a baseboard heater (e.g. an electrical baseboard heater) in a bottom portion of the frame. Chords 1804 may be square hollow tubes connected by a struts 1805 described herein. FIG. 19 depicts a green wall portion 1900 comprising chords 1901 and struts 1902 forming a truss according to embodiments of the invention described herein. The chords 1901 and struts 1902 are may be defined within drywall 1903 and cement board 1905. Tiles 1906 may be overlayed onto cement board 1905. Vapour barrier 1904 may be defined between chords 1901 and drywall 1903. Insulation, such as insulation roxul 1907 or spay foam insulation 1900 may be defined between the chord 1901 of the trusses.

FIG. 20A depicts a deck 2000 comprising deck planks 2001 overlayed on trusses 2004 according to the present invention described above. As shown in FIGS. 20B and 20C, trusses 2004 may be connected to deck plank 2001 be angle 2005 and fasteners 2006, 2007. Fastener 2006, may connect a first portion of angle 2005 to deck plank 2001, while fasteners 2007 connect a second portion of angle 2005 to truss 2004. Fasteners 2006 and 2007 may be wood screws, nails, or other suitable fasteners to connect objects together. Prior art decks are generally formed by fastening deck planks to a support structure where the fasteners is nails, screwed, or otherwise passed through the upper surface of the deck plank. By connecting trusses 2004 to the downward facing side of deck plank 2001, rain water and other precipitation may not enter openings in the deck plank 2001 around fasteners 2006. This preserves the deck plank and fasteners as deterioration (e.g. rusting or rot) caused by water contact is minimized.

Figure 21A:
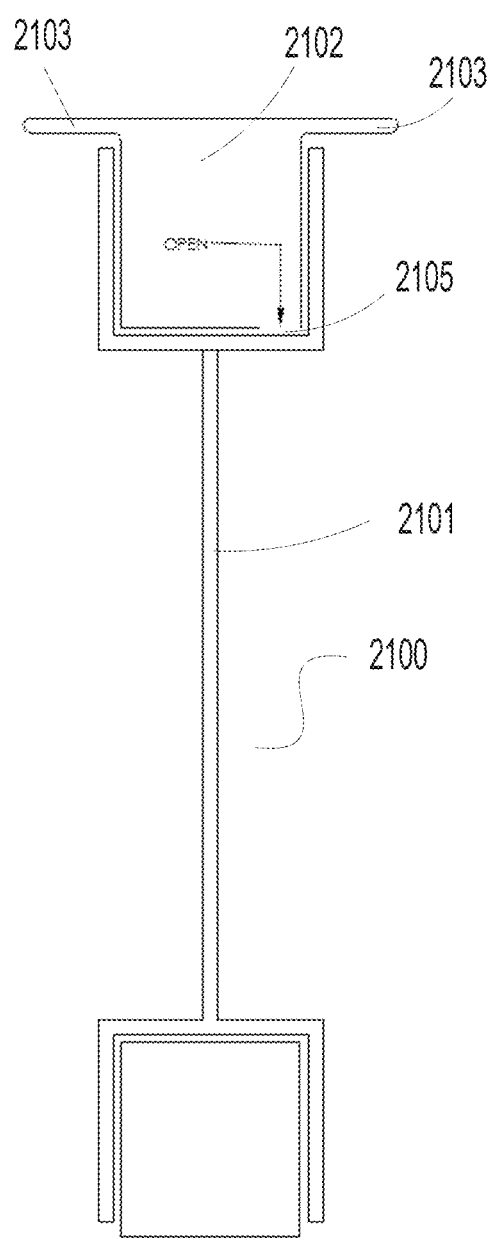
FIG. 21A is an elevation view of truss according to some embodiments.
Figure 21B:
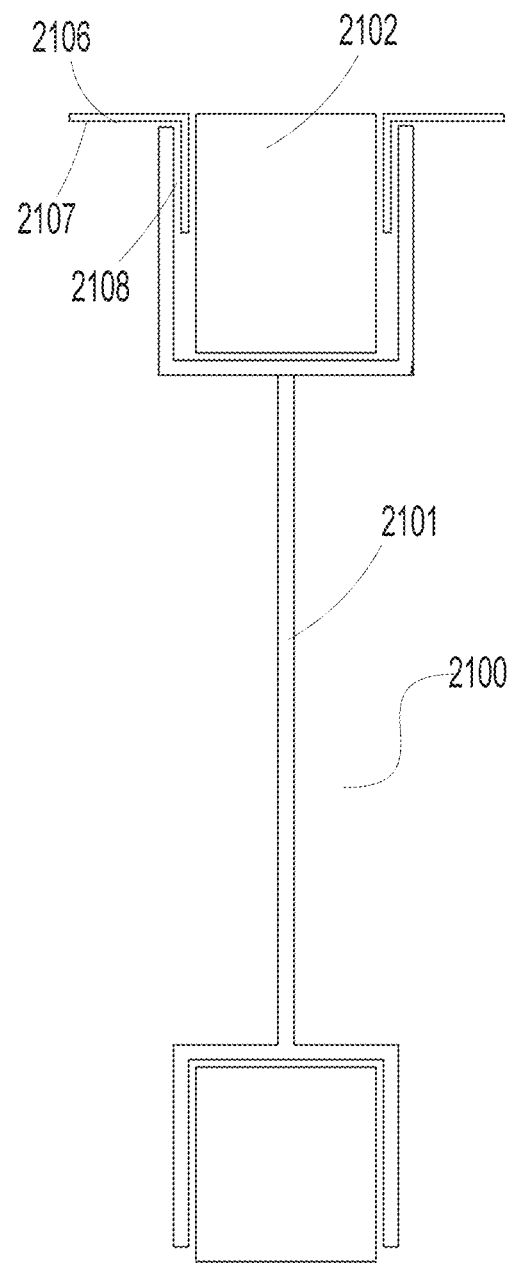
FIG. 21B is an elevation view of a another truss according to some embodiments.

FIGS. 21A and 21B depicts an embodiment of a truss 2100 that may be used to form a deck, e.g. the deck depicted in FIG. 20A. A strut 2101, according to the present invention, may be connected to chord 2102. Chord 2102 may have laterally extending members 2103, which extend beyond strut 2101, and are configured to be connected to a bottom surface of a deck plank (not shown). Fasteners, e.g. screw, nails or the like, may be used to connect laterally extending members 2103 to the deck plank. Chord 2102 may define a hollow interior, and may have an opening 2105 to permit air circulation into the hollow interior. In another embodiment, chord 2102 may have a conventional square or rectangular cross-section as shown in FIG. 21B. Angles 2106 may be used to connect truss 2100 to a deck plank. As shown, a first portion 2107 of angles 2106 may extend laterally from chord 2102 and a second portion 2108 extending along chord 2102. Fasteners (not shown) may connect angles 2106 to a deck plank and chord 2102 respectively.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A strut for forming a truss or a joist, the strut comprising:
 a body member having a longitudinal axis, the body member having a first end and a second end;
 a first gripping member connected to the first end of the body member, the first gripping member comprising a first plate and at least one lip for engaging a first structural member having a length and a width, the at least one lip being non-planar with respect to the first plate, wherein the first gripping member defines an opening for receiving the first structural member; wherein the first plate has a length configured to define a first portion of the length of the first structural member, wherein the first plate has a width configured to define the width of the first structural member, wherein the at least one lip has a length configured to define a second portion of the length of the first structural member, wherein the length of the at least one lip is less than or equal to a length of an intersection between the body member and the first plate;
 a second gripping member connected to the second end of the body member, the second gripping member comprising a second plate for engaging a second structural member having a length and a width;
 wherein the body member extends between the first plate and the second plate in a direction to intercept and connect to each of the first and second gripping members,
 wherein the first plate has a surface defining a plane, and wherein the body member forms an acute angle α and an obtuse angle β with respect to the plane, and
 wherein, when the first gripping member engages the first structural member and the second gripping member engages the second structural member:
  the first structural member and the second structural member are positioned in opposed spaced relationship having opposing surfaces, the first plate engages one of the opposing surfaces and the second plate engages the other of the opposing surfaces,
  each of the at least one lip of the first gripping member engages a lateral surface of the first structural member, and the longitudinal axis of the body member intersects a center point of the width of each of the first structural member and the second structural member.

2. The strut of claim 1, wherein the body member connects to and bifurcates each of the plates.

3. The strut of claim 1, wherein the body member is generally flat.

4. The strut of claim 3, wherein the body member comprises a plurality of indented impressions.

5. The strut of claim 1, wherein the first and second plates each have a surface defining generally parallel planes, and wherein the body member extends in the direction to intercept each of the parallel planes, the body member connecting and bifurcating each of the surfaces.

6. The strut of claim 5, wherein the body member connects to the first gripping member and the second gripping member and intercepts the planes of the first gripping member and second gripping member forming an acute angle of approximately 45 deg with respect to each of the planes of the first gripping member and the second gripping member.

7. The strut of claim 1, wherein the first and second plates each have a surface to which the body member connects and bifurcates into generally parallelogram shaped segments.

8. The strut of claim 1, wherein the second gripping member comprises at least one lip, wherein the at least one lip of the second gripping member is non-planar with respect to the second plate.

9. The strut of claim 8, wherein the at least one lip of each of the first and second gripping members comprises a plurality of fastening points.

10. The strut of claim 1, wherein the second plate has a length configured to define a portion of the length of the second structural member, wherein the second plate has a width configured to define the width of the second structural member, wherein the second plate has a surface defining a second plane, and wherein the body member forms an acute angle $\alpha'$ and an obtuse angle $\beta'$ with respect to the second plane, and wherein acute angle $\alpha$ does not equal acute angle $\alpha'$ and obtuse angle $\beta$ does not equal obtuse angle $\beta'$.

11. The strut of claim 1, wherein the body member has a quadrilateral cross section.

12. The strut of claim 1, wherein the first plate is configured to bend at an edge of the first plate relative to the body member to engage the first structural member.

13. A system of forming a truss or a joist, the system comprising:
a plurality of struts of claim 1 comprising a first strut and a second strut, the first strut configured to be positioned adjacent the second strut between the first structural member and the second structural member;
wherein, when the first gripping member of the first strut engages the first structural member and the second gripping member of the first strut engages the second structural member, and when the first gripping member of the second strut engages the first structural member and the second gripping member of the second strut engages the second structural member:
the first and second strut form a v-shaped web, and
the plurality of struts, the first structural member, and the second structural member form at least one triangle lying in a single plane.

14. A method of making a truss for forming a truss or a joist, the method comprising:
providing a plurality of the strut of claim 1;
connecting the first gripping member of a first strut of the plurality of the struts of claim 1 to a first structural member and the second gripping member of the first strut to a second structural member;
connecting a second strut of the plurality of the struts of claim 1 to the first structural member and second structural member, wherein the first gripping member of the second strut is connected to the first structural member adjacent to the first gripping member of the first strut, and connecting the second gripping member of the second strut to the second structural member;
positioning the first structural member and the second structural member in opposed spaced relationship having opposing surfaces, the first plate of each first gripping member engaging one of the opposing surfaces and each of the second plate of each second gripping member engaging the other of the opposing surfaces, wherein each of the at least one lip of the first gripping member engages a lateral surface of the first structural member, and
the longitudinal axis of the body member of each strut of the plurality of strut of claim 1 intersects a center point of a width of each of the first structural member and the second structural member.

15. The method of claim 14, wherein the body member is generally flat and bifurcates each plate.

16. The method of claim 14, wherein the body member of each of the plurality of the strut of claim 1 forms an acute angle $\alpha'$ and an obtuse angle $\beta'$ with respect to the second plate, and wherein acute angle $\alpha$ is different than acute angle $\alpha'$ and obtuse angle $\beta$ is different than obtuse angle $\beta'$.

17. The method of claim 14, wherein the body member of each of the plurality of the strut of claim 1 has a quadrilateral cross section.

* * * * *